US012304035B2

(12) United States Patent
Tomayko et al.

(10) Patent No.: US 12,304,035 B2
(45) Date of Patent: May 20, 2025

(54) POWER TOOL

(71) Applicant: Black & Decker Inc., New Britain, CT (US)

(72) Inventors: David Tomayko, Ellicott City, MD (US); Tyler Petrus, Baltimore, MD (US); Abhinav Jayakumar, Towson, MD (US)

(73) Assignee: Black & Decker Inc., New Britian, CT (US)

( * ) Notice: Subject to any disclaimer, the term of this patent is extended or adjusted under 35 U.S.C. 154(b) by 21 days.

(21) Appl. No.: 18/460,379

(22) Filed: Sep. 1, 2023

(65) Prior Publication Data

US 2025/0073866 A1 Mar. 6, 2025

Related U.S. Application Data

(63) Continuation-in-part of application No. 17/644,110, filed on Dec. 14, 2021, now Pat. No. 12,011,815.

(60) Provisional application No. 63/127,717, filed on Dec. 18, 2020.

(51) Int. Cl.
*B25B 21/02* (2006.01)
*B25F 5/00* (2006.01)

(52) U.S. Cl.
CPC ............ *B25B 21/026* (2013.01); *B25F 5/001* (2013.01)

(58) Field of Classification Search
CPC ........ B25B 23/14; B25B 21/026; B25F 5/001
See application file for complete search history.

(56) References Cited

U.S. PATENT DOCUMENTS

| | | | |
|---|---|---|---|
| 2,585,486 | A | 2/1952 | Mitchell |
| 3,041,902 | A | 7/1962 | Wing |
| 3,319,093 | A | 5/1967 | Abdul |
| 3,369,615 | A | 2/1968 | Maffey, Jr. et al. |

(Continued)

FOREIGN PATENT DOCUMENTS

| | | | |
|---|---|---|---|
| DE | 102017211779 | A1 | 1/2018 |
| DE | 102017119807 | A1 | 2/2019 |

(Continued)

OTHER PUBLICATIONS

Milwaukee Operator's Manual for 2862-20, 2863-20, 2864-20 (Year: 2018).

(Continued)

*Primary Examiner* — Daniel Jeremy Leeds

(57) ABSTRACT

A power tool includes a housing, a motor being controlled to run at a speed between 15000 rpm and 32000 rpm, an output spindle, a rotary impact assembly configured to transmit rotational motion with intermittent rotational impacts from a cam shaft to the output spindle, a hammer of the rotary impact assembly having an inertia between 400 kg·mm$^2$ and 3000 kg·mm$^2$, and a single stage compound planetary transmission including a first planet gear meshed with a sun gear and a second planet gear meshed with a ring gear, the compound planet gear being carried by a planet carrier to achieve a gear reduction ratio between 14:1 and 30:1. The power tool is configured to achieve a fastening torque of at least 900 foot-pounds (a) in a time of less than 3.5 seconds, and/or (b) with an input energy of less than 2500 Joules.

20 Claims, 16 Drawing Sheets

(56) References Cited

U.S. PATENT DOCUMENTS

| | | | |
|---|---|---|---|
| 3,675,510 | A | 7/1972 | Duggar, Jr. |
| 5,136,197 | A | 8/1992 | Hallett |
| 5,711,739 | A | 1/1998 | Hashimoto et al. |
| 6,223,833 | B1 | 5/2001 | Thurler et al. |
| 6,550,546 | B2 | 4/2003 | Thurler et al. |
| 7,498,526 | B2 | 3/2009 | Lohr et al. |
| 8,047,100 | B2 | 11/2011 | King |
| 8,128,250 | B2 | 3/2012 | Parrinello |
| 8,381,831 | B2 | 2/2013 | Sekino et al. |
| 8,382,308 | B2 | 2/2013 | Hecht et al. |
| 8,602,125 | B2 | 12/2013 | King |
| 8,602,582 | B2 | 12/2013 | Parrinello |
| 8,672,797 | B2 | 3/2014 | Fox |
| 8,851,698 | B2 | 10/2014 | Parrinello |
| 8,985,240 | B2 | 3/2015 | Winnard |
| 9,233,461 | B2 | 1/2016 | Tomayko |
| 9,481,081 | B2 | 11/2016 | Hecht et al. |
| 9,541,172 | B1 | 1/2017 | Wright |
| 9,604,354 | B2 | 3/2017 | Tomayko |
| 9,920,818 | B2 | 3/2018 | Wright |
| RE46,827 | E | 5/2018 | Rudolph et al. |
| 10,159,495 | B1 | 12/2018 | Lambert |
| 10,195,731 | B2 | 2/2019 | Tomayko |
| 10,253,848 | B2 | 4/2019 | Hatch et al. |
| 2002/0037785 | A1 | 3/2002 | Wissmach et al. |
| 2003/0002934 | A1 | 1/2003 | Hsu |
| 2006/0262519 | A1 | 11/2006 | Hirschburger et al. |
| 2017/0259412 | A1 | 9/2017 | Nishikawa et al. |
| 2018/0133884 | A1 | 5/2018 | Winnard |
| 2018/0243896 | A1 | 8/2018 | Winnard |
| 2019/0255687 | A1 | 8/2019 | Schneider et al. |
| 2019/0301571 | A1 | 10/2019 | Tesar |
| 2021/0187707 | A1 * | 6/2021 | Smith .................... H02K 7/116 |

FOREIGN PATENT DOCUMENTS

| | | | |
|---|---|---|---|
| EP | 2210708 | A2 | 7/2010 |
| EP | 4 015 153 | A1 | 6/2022 |

OTHER PUBLICATIONS

International Search Report issued in corresponding PCT Application No. PCT/US2024/044625, dated Jan. 8, 2025.

* cited by examiner

TP₁ w/ B₂

$TP_2$ w/ $B_2$ $TP_2$ w/ $B_1$ $PA_1$ w/ $B_1$ $PA_2$ w/ $B_3$

PA₃ w/ B₄

POWER TOOL

TECHNICAL FIELD

This application relates to an impact tool (such as an impact driver or an impact wrench) that has compact construction. Particularly, the impact tool includes a compact transmission providing a high speed reduction ratio with a high output torque.

BACKGROUND

A power tool such as an impact tool (e.g., an impact driver or an impact wrench) generally includes a motor, a transmission, an impact mechanism, and an output spindle. The impact mechanism generally includes a cam shaft coupled to the transmission, a hammer received over the cam shaft for rotational and axial movement relative to the cam shaft, an anvil coupled to the output spindle, and a spring that biases the hammer toward the spindle. When a low amount of torque is applied to the output spindle, the hammer remains engaged with the anvil and transmits rotational motion from the transmission to the output spindle without any impacts. When a higher amount of torque is applied to the output spindle, the hammer disengages from the anvil and transmits rotary impacts to the anvil and the output spindle. The mechanical characteristics of the impact mechanism components generally determine the output torque at which the impact mechanism transitions from operation in the rotary mode to the impact mode.

SUMMARY

In an aspect, a power tool such as an impact power tool is described. The impact power tool includes one or more of the following features including a housing, a motor, an output spindle, a rotary impact assembly, and a planetary transmission having a fixed ring gear and rotatable planet gear carrier. In an aspect, the housing includes a rearward portion and a forward portion. The motor is disposed in the rearward portion of the housing and having a motor output shaft. The output spindle is disposed at least partially in the forward portion of the housing. The rotary impact assembly is disposed in the forward portion of the housing and including a cam shaft, a hammer carried by the cam shaft, a hammer spring acting on the hammer, and an anvil coupled to the output spindle. The rotary impact assembly is configured to transmit rotational motion with intermittent rotational impacts from the cam shaft to the output spindle. The planetary transmission is configured to transmit rotational motion from the motor output shaft to the cam shaft at a single overall speed reduction ratio. The planetary transmission includes a sun gear rotatably driven by the motor output shaft, a planet carrier rotatably driving the cam shaft, a ring gear rotationally fixed relative to the tool housing, a first planet gear mounted to the planet carrier and meshed with the sun gear but not meshed with the ring gear and a second planet gear mounted to the carrier and meshed with the ring gear but not meshed with the sun gear. The first planet gear has a first pitch diameter and the second planet gear has a second pitch diameter that is different than the first pitch diameter.

In an aspect, the first pitch diameter is greater than the second pitch diameter.

In an aspect, the second planet gear is at least partially axially rearward of the first planet gear.

In an aspect, the planet carrier includes a rear plate, and a pin supported by the rear plate and configured to support the first planet gear and the second planet gear with the second planet gear adjacent the rear plate. In an aspect, the planet carrier includes a front plate, and the pin supported by the front plate and configured to support the first planet gear and the second planet gear with the first planet gear adjacent the front plate. In an aspect, both rear plate and the front plate may be included and the pin extends between the rear plate and the front plate. The planet carrier is nested at least partially inside the ring gear. In an aspect, the rear plate is coupled to a rear hub supported by a rear bearing that is nested at least partially inside the ring gear.

In an aspect, the planetary transmission has an overall speed reduction ratio from the motor output shaft to the cam shaft. In an aspect, the second planet gear is positioned axially rearward of the first planet gear so that power flows non-sequentially through the planetary transmission.

In an aspect, the overall speed reduction ratio (SRR) is computed as a sum of 1 and product of ratios P1/S and R/P2, where SRR is the overall speed reduction ratio, P1 is the first pitch diameter, S is a pitch diameter of the sun gear, R is a pitch diameter of the ring gear, and P2 is the second pitch diameter. In an aspect, the overall speed reduction ratio is at least 14:1. In an aspect, the overall speed reduction ratio is at least 20:1.

In an aspect, the sun gear, the first planet gear, the second planet gear, and the ring gear, or a combination thereof have helical teeth. In an aspect, the sun gear and the first planet gear each have helical teeth. In an aspect, the second planet gear and the ring gear each have helical teeth. In an aspect, the helical teeth on the first planet gear are at a first helix angle and the helical teeth on the second planet gear are at a second helix angle that is less than the first helix angle. In an aspect, first teeth of the first planet gear have a larger tooth size than second teeth of the second planet gear.

In an aspect, an outer periphery of the first planet gear is at a first radial distance from the axis and an outer periphery of the ring gear is at a second radial distance from the axis that is less than the first radial distance.

In an aspect, the first planet gear and the second planet gear are integral to form a single compound planet gear.

Furthermore, in an aspect, an impact power tool includes one or more of the following features including a housing, a motor, an output spindle, a rotary impact assembly, and a planetary transmission having a rotatable ring gear and a fixed planet gear carrier. The housing having a rearward portion, and a forward portion. The motor is disposed in the rearward portion of the housing and having a motor output shaft. The output spindle is received at least partially in the forward portion of the housing. The rotary impact assembly is received in the forward portion of the housing and including a cam shaft, a hammer carried by the cam shaft, a hammer spring acting on the hammer, and an anvil coupled to the output spindle, the rotary impact assembly configured to transmit rotational motion with intermittent rotational impacts from the cam shaft to the output spindle. The planetary transmission is configured to transmit rotary power from the motor output shaft to the cam shaft, the planetary transmission including a sun gear coupled to the motor output shaft, a first planet gear with a first pitch diameter meshed with the sun gear, a second planet gear with a second pitch diameter that is different than the first pitch diameter, a carrier that carries both the first planet gear and the second planet gear and that is rotationally fixed relative to the tool housing, a rotatable ring gear meshed with the second planet gear and coupled to the cam shaft to provide rotational output from the transmission to the cam shaft.

The sun gear and the first planet gear, the second planet gear and the ring gear and the transmission provides an overall speed reduction ratio from the motor output shaft. The overall speed reduction ratio (SRR) is computed as a product of a ratios P1/S and R/P2 where, SRR is the overall speed reduction ratio, P1 is the first pitch diameter, S is a pitch diameter of the sun gear, R is a pitch diameter of the ring gear, and P2 is the second pitch diameter. In an aspect, the overall speed reduction ratio is at least 14:1. In an aspect, the overall speed reduction ratio is at least 20:1.

In an aspect, the sun gear and the first planet gear each have helical teeth. In an aspect, the second planet gear and the ring gear each have helical teeth. In an aspect, the helical teeth on the first planet gear are at a first helix angle and the helical teeth on the second planet gear are at a second helix angle that is less than the first helix angle. In an aspect, first teeth of the first planet gear have a larger tooth size than second teeth of the second planet gear.

In aspect, the first planet gear and the second planet gear are integral to form a compound planet gear. In an aspect, the second planet gear is positioned axially forward of the first planet gear.

Furthermore, in an aspect, there is provided an impact power tool including a housing having a rearward portion, and a forward portion, a motor disposed in the rearward portion of the housing and having a motor output shaft, an output spindle received at least partially in the forward portion of the housing, a rotary impact assembly received in the forward portion of the housing and including a cam shaft, a hammer carried by the cam shaft, a hammer spring acting on the hammer, and an anvil coupled to the output spindle, the rotary impact assembly configured to transmit rotational motion with intermittent rotational impacts from the cam shaft to the output spindle, and a transmission configured to transmit rotary power from the motor output shaft to the cam shaft, where the transmission configured to provide an overall speed reduction ratio of at least 14:1 and having an outer diameter of less than 150 mm and a length of less than 40 mm.

In an aspect, the transmission is a planetary transmission configured including a sun gear rotatably driven by the motor output shaft, a planet carrier rotatably driving the cam shaft, a ring gear rotationally fixed relative to the tool housing, a first planet gear mounted to the planet carrier and meshed with the sun gear but not meshed with the ring gear and a second planet gear mounted to the carrier and meshed with the ring gear but not meshed with the sun gear.

In an aspect, the transmission is a planetary transmission including a sun gear coupled to the motor output shaft, a first planet gear with a first pitch diameter meshed with the sun gear, a second planet gear with a second pitch diameter that is different than the first pitch diameter, a carrier that carries both the first planet gear and the second planet gear and that is rotationally fixed relative to the tool housing, a rotatable ring gear meshed with the second planet gear and coupled to the cam shaft to provide rotational output from the transmission to the cam shaft.

In an aspect, the first planet gear and the second planet gear have helical teeth. In an aspect, the first planet gear and the second planet gear are integral to form a compound planet gear.

Furthermore, in an aspect, there is provided an impact power tool including a housing having a rearward portion, and a forward portion, a motor disposed in the rearward portion of the housing and having a motor output shaft, an output spindle received at least partially in the forward portion of the housing; a rotary impact assembly received in the forward portion of the housing and including a cam shaft, a hammer carried by the cam shaft, a hammer spring acting on the hammer, and an anvil coupled to the output spindle, the rotary impact assembly configured to transmit rotational motion with intermittent rotational impacts from the cam shaft to the output spindle, and a transmission configured to transmit rotary power from the motor output shaft to the cam shaft, where the transmission configured to provide an overall speed reduction ratio of at least 14:1 within a volume of less than 60 $cm^2$.

In an aspect, the transmission is a planetary transmission configured including a sun gear rotatably driven by the motor output shaft, a planet carrier rotatably driving the cam shaft, a ring gear rotationally fixed relative to the tool housing, a first planet gear mounted to the planet carrier and meshed with the sun gear but not meshed with the ring gear and a second planet gear mounted to the carrier and meshed with the ring gear but not meshed with the sun gear.

In an aspect, the transmission is a planetary transmission including a sun gear coupled to the motor output shaft, a first planet gear with a first pitch diameter meshed with the sun gear, a second planet gear with a second pitch diameter that is different than the first pitch diameter, a carrier that carries both the first planet gear and the second planet gear and that is rotationally fixed relative to the tool housing, a rotatable ring gear meshed with the second planet gear and coupled to the cam shaft to provide rotational output from the transmission to the cam shaft.

In one aspect, a power tool includes a housing, a motor, an output spindle, a rotary impact assembly, and a single stage compound planetary transmission. The housing includes a rearward portion and a forward portion. The motor is disposed in the rearward portion of the housing and has a motor output shaft. The motor is controlled to run at a speed between 15000 rotations per minute (rpm) and 32000 rpm. The output spindle is disposed at least partially in the forward portion of the housing. The rotary impact assembly is disposed in the forward portion of the housing and includes a cam shaft, a hammer received over the cam shaft and configured to move rotationally and axially relative to the cam shaft, an anvil coupled to the output spindle, and a spring biasing the hammer axially forward toward the anvil. The rotary impact assembly is configured so that the hammer transmits rotational motion to the anvil without rotational impacts when a torque on the output spindle is less than a threshold torque and to apply intermittent rotational impacts to the anvil when the torque on the output spindle is at least the threshold torque. The hammer has an inertia between 400 kilogram millimeters squared ($kg \cdot mm^2$) and 3000 $kg \cdot mm^2$. The single stage compound planetary transmission is configured to transmit rotational motion from the motor output shaft to the cam shaft. The planetary transmission includes a sun gear rotatably driven by the motor output shaft, a planet carrier rotatably driving the cam shaft, a ring gear rotationally fixed relative to the housing, and a compound planet gear. The compound planet gear includes a first planet gear meshed with the sun gear but not the ring gear and a second planet gear meshed with the ring gear but not the sun gear. The compound planet gear is carried by the planet carrier. The compound planetary transmission has a gear reduction ratio between 14:1 and 30:1. The power tool is configured to achieve a fastening torque of at least 900 foot-pounds (ft-lbs) in a time of less than 3.5 seconds.

In an aspect, the power tool is configured to achieve the fastening torque of at least 900 ft-lbs with an input energy of less than 2500 Joules (J).

In an aspect, the power tool is configured to achieve a maximum fastening torque that is at least 1200 ft-lbs and a maximum breakaway torque that is at least 1700 ft-lbs.

In an aspect, at least one of a ratio of maximum fastening torque to tool length of at least 5.5 ft-lbs/mm, a ratio of maximum fastening torque to tool housing volume of at least 0.06 ft-lbs/$mm^2$, or a ratio of maximum fastening torque to tool weight, without a battery, of at least 160 ft-lbs/lb.

In an aspect, at least one of a ratio of maximum tightening torque to transmission diameter of at least 8.0 ft-lbs/mm, a ratio of maximum tightening torque to transmission length of at least 30 ft-lbs/mm, and a ratio of maximum tightening torque to transmission volume of at least 20 ft-lbs/$cm^2$.

In an aspect, the beat rate of the hammer is between 1500 and 2400 beats per minute.

In an aspect, the tool further comprises a battery back configured to supply power to the motor, the battery pack having a nominal voltage of at least 18 Volts (V) a capacity of at least 5 amp hours (Ah), and an impedance of less than or equal to 50 milliohms (mOhms).

In an aspect, a diameter of the transmission is between 40 millimeters (mm) and 200 mm.

In an aspect, a length of the transmission is between 15 millimeters (mm) and 60 mm.

In an aspect, the first planet gear has a first pitch diameter and the second planet gear has a second pitch diameter that is less than the first pitch diameter.

In one aspect, a power tool includes a housing, a motor, an output spindle, a rotary impact assembly, and a single stage compound planetary transmission. The housing includes a rearward portion and a forward portion. The motor is disposed in the rearward portion of the housing and has a motor output shaft. The motor is controlled to run at a speed between 15000 rotations per minute (rpm) and 32000 rpm. The output spindle is disposed at least partially in the forward portion of the housing. The rotary impact assembly is disposed in the forward portion of the housing and includes a cam shaft, a hammer received over the cam shaft and configured to move rotationally and axially relative to the cam shaft, an anvil coupled to the output spindle, and a spring biasing the hammer axially forward toward the anvil. The rotary impact assembly is configured so that the hammer transmits rotational motion to the anvil without rotational impacts when a torque on the output spindle is less than a threshold torque and to apply intermittent rotational impacts to the anvil when the torque on the output spindle is at least the threshold torque. The hammer has an inertia between 400 kilogram millimeters squared (kg·$mm^2$) and 3000 kg·$mm^2$. The single stage compound planetary transmission is configured to transmit rotational motion from the motor output shaft to the cam shaft. The planetary transmission includes a sun gear rotatably driven by the motor output shaft, a planet carrier rotatably driving the cam shaft, a ring gear rotationally fixed relative to the housing, and a compound planet gear. The compound planet gear includes a first planet gear meshed with the sun gear but not the ring gear and a second planet gear meshed with the ring gear but not the sun gear. The compound planet gear is carried by the planet carrier. The compound planetary transmission has a gear reduction ratio between 14:1 and 30:1. the power tool is configured to achieve a fastening torque of at least 900 foot-pounds (ft-lbs) with an input energy of less than 2500 Joules (J).

In an aspect, the power tool is configured to achieve a maximum fastening torque that is at least 1200 ft-lbs and a maximum breakaway torque that is at least 1700 ft-lbs.

In an aspect, at least one of a ratio of maximum fastening torque to tool length of at least 5.5 ft-lbs/mm, a ratio of maximum fastening torque to tool housing volume of at least 0.06 ft-lbs/mm2, or a ratio of maximum fastening torque to tool weight, without a battery, of at least 160 ft-lbs/lb.

In an aspect, at least one of a ratio of maximum tightening torque to transmission diameter of at least 8.0 ft-lbs/mm, a ratio of maximum tightening torque to transmission length of at least 30 ft-lbs/mm, and a ratio of maximum tightening torque to transmission volume of at least 20 ft-lbs/cm2.

In an aspect, the beat rate of the hammer is between 1500 and 2400 impacts per minute.

In an aspect, the tool further comprises a battery having a nominal voltage of at least 18 Volts (V), a capacity of at least 5 amp hours (Ah), and an impedance of less than or equal to 50 milliohms (mOhms).

In an aspect, a diameter of the transmission is between 40 mm and 200 mm.

In an aspect, a length of the transmission is between 15 mm and 60 mm.

In an aspect, the first planet gear has a first pitch diameter and the second planet gear has a second pitch diameter that is less than the first pitch diameter.

In one aspect, a power tool includes a housing, a motor, an output spindle, a rotary impact assembly, and a single stage compound planetary transmission. The housing includes a rearward portion and a forward portion. The motor is disposed in the rearward portion of the housing and has a motor output shaft. The motor is controlled to run at a speed between 15000 rotations per minute (rpm) and 32000 rpm. The output spindle is disposed at least partially in the forward portion of the housing. The rotary impact assembly is disposed in the forward portion of the housing and includes a cam shaft, a hammer received over the cam shaft and configured to move rotationally and axially relative to the cam shaft, an anvil coupled to the output spindle, and a spring biasing the hammer axially forward toward the anvil. The rotary impact assembly is configured so that the hammer transmits rotational motion to the anvil without rotational impacts when a torque on the output spindle is less than a threshold torque and to apply intermittent rotational impacts to the anvil when the torque on the output spindle is at least the threshold torque. The hammer has an inertia between 400 kilogram millimeters squared (kg·$mm^2$) and 3000 kg·$mm^2$. The single stage compound planetary transmission is configured to transmit rotational motion from the motor output shaft to the cam shaft. The planetary transmission includes a sun gear rotatably driven by the motor output shaft, a planet carrier rotatably driving the cam shaft, a ring gear rotationally fixed relative to the housing, and a compound planet gear. The compound planet gear includes a first planet gear meshed with the sun gear but not the ring gear and a second planet gear meshed with the ring gear but not the sun gear. The compound planet gear is carried by the planet carrier. The compound planetary transmission has a gear reduction ratio between 14:1 and 30:1, such that the beat rate of the hammer is between 1500 and 2400 beats per minute. The power tool is configured to achieve a fastening torque of at least 900 foot-pounds (ft-lbs) in a time of less than 3.5 seconds with an input energy of less than 2500 Joules (J).

Advantages may include one or more of the following. A higher speed reduction is achieved compared to existing impact tools within a compact space. The compact impact tool can deliver a higher torque and power output at a reduced speed compared to existing tools. Such higher torque and power output is highly beneficial to drive in fasteners quickly into tough objects like concrete, bricks, stone, etc. Additionally, a higher overall tool efficiency can be achieved which enables the impact driver to use less power from the battery. These and other advantages and features will be apparent from the description, the drawings, and the claims.

DETAILED DESCRIPTION

Figure 1:
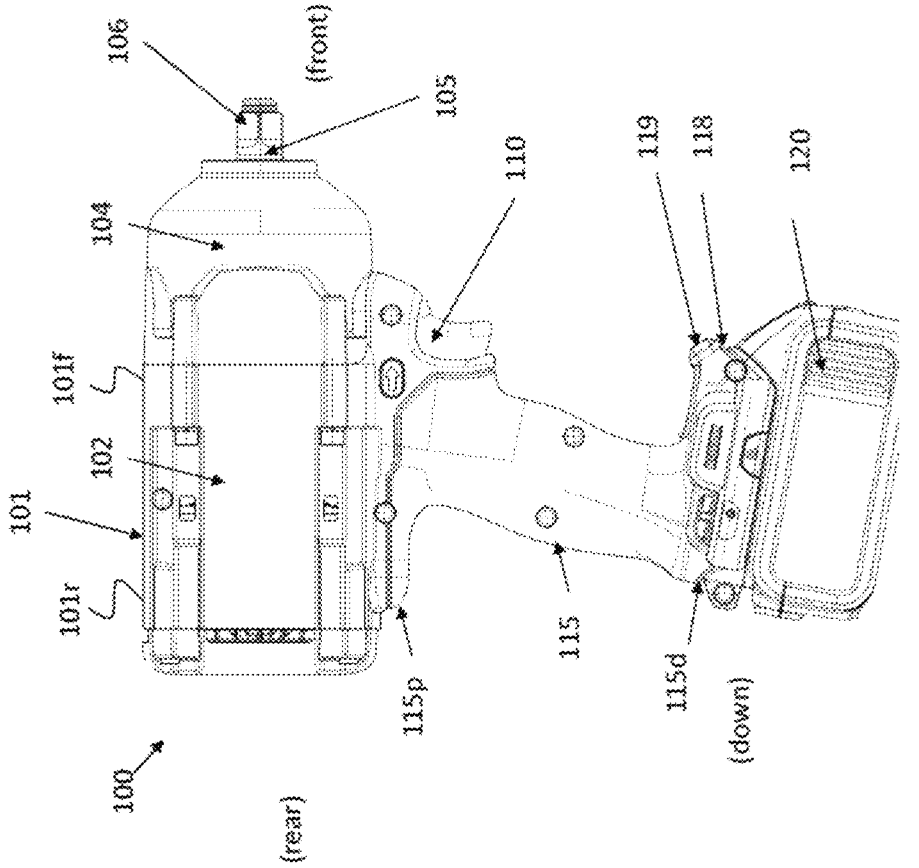
FIG. 1 is a perspective view of an exemplary power tool, according to an embodiment.
Figure 2:
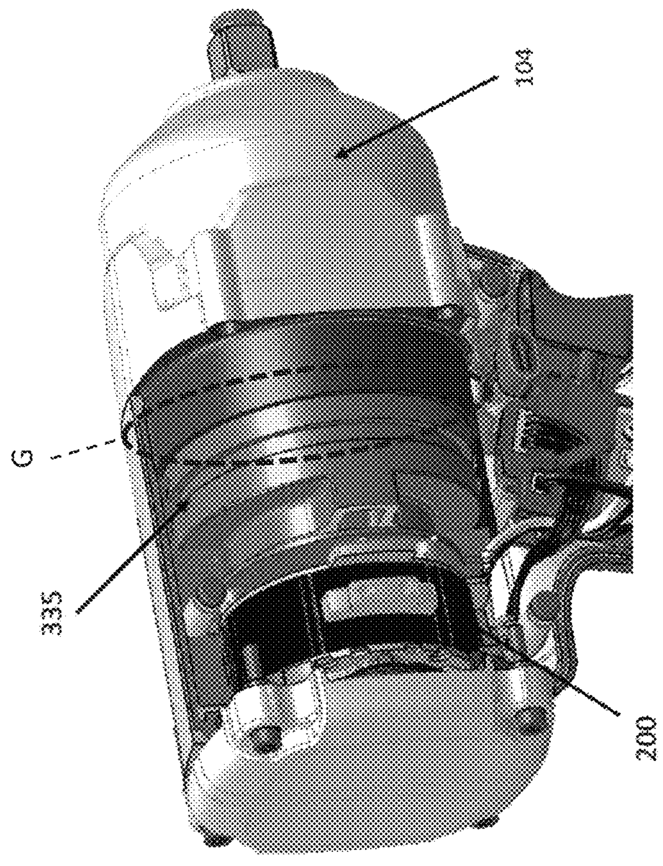
FIG. 2 is partial sectioned view of the power tool illustrating a motor, and a portion of the transmission of FIG. 1, according to an embodiment.
Figure 3:
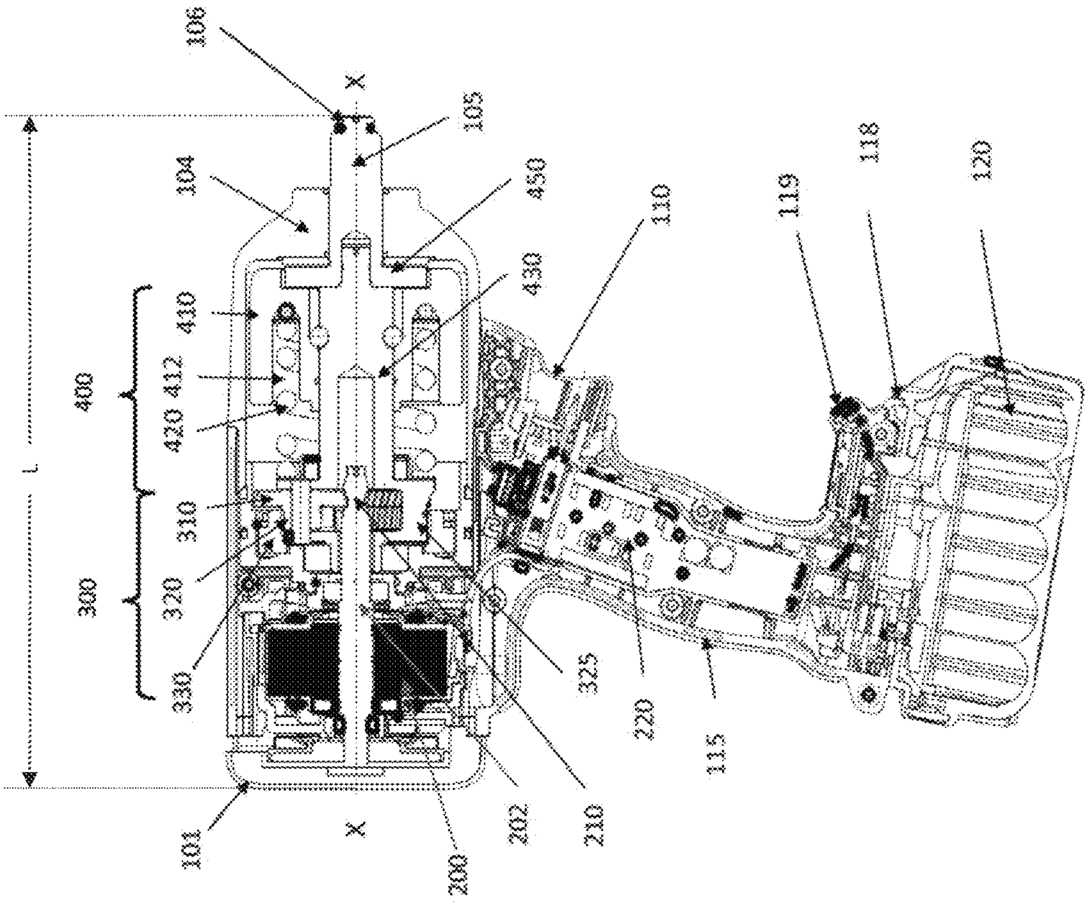
FIG. 3 is sectioned view of the power tool of FIG. 1 illustrating a transmission, an impact mechanism, and output spindle, according to an embodiment.

With reference to FIGS. 1, 2, and 3, a power tool constructed in accordance with the teachings of the present disclosure is generally indicated by reference numeral 100. As those skilled in the art will appreciate, such power tool 100 may be an impact driver or impact wrench that is corded (e.g., powered by AC mains), cordless (e.g., battery operated), or pneumatic (e.g., powered by compressed air). In the particular embodiment illustrated, power tool 100 may be a cordless impact wrench having a housing 101, a motor assembly 200, a transmission assembly 300, an output spindle 105, an impact mechanism 400, a trigger 110 and a battery pack 120. In other embodiments, the power tool may be an impact driver.

In an embodiment, the housing 101 has a front portion 101*f* and a rear portion 101*r*. The housing 101 includes a motor housing portion 102 (at the rear portion 101*r*) that contains the motor assembly 200 and a transmission housing portion 104 (at the front portion 101*f*) that contains the transmission assembly 300 (see FIGS. 3 and 4A) and the impact mechanism 400 (see FIGS. 3 and 4A). The transmission assembly 300 and impact mechanism 400 transmit rotary motion from the motor assembly 200 to an output spindle 105, as described in greater detail below. Coupled to the output spindle 105 is a tool holder 106 for retaining a tool bit (e.g., a socket, a drill bit, a screw driving bit, etc., not shown). In the illustrated embodiment, the tool holder 106 comprises a square drive shaft configured to receive a socket. The output spindle 105 and the tool holder 106 together define and extend along a tool axis X-X.

Extending downward and slightly rearward of the housing 101 is a handle 115 in a pistol grip formation. The handle 115 has a proximal portion 115*p* coupled to the housing 101 and a distal portion 115*d* coupled to a battery receptacle 118. The motor assembly 200 may be powered by an electrical power source, such as a DC power source or the battery pack 120, that is coupled to the battery receptacle 118, or by an AC power source. The motor assembly 200 includes a motor that receives power. In the present disclosure, the motor assembly 200 and the motor 200 may be interchangeably used for simplicity. The trigger 110 is coupled to the handle 115. The trigger 110 connects the electrical power source to the motor 200 via a controller 220 that controls power delivery to the motor 200, as described in greater detail below. In an embodiment, an amount of distance that the trigger 110 is depressed controls the speed delivered by the motor 200. In an embodiment, a light unit 119 (e.g., an LED) may be disposed at a front top portion of the battery receptacle 118 (see FIGS. 1 and 3). In an embodiment, a light unit (e.g., an LED) may be disposed on the front end portion of the housing 101, just below the tool holder 106 to illuminate an area in front of the tool holder 106. Power delivery to the light unit may be controlled by the trigger 110 and the controller 220, or by a separate switch on the tool.

Those of skill in the art will appreciate that various components of the power tool 100, such as the motor assembly 200, the trigger 110, the controller 220, and the battery pack 120, can be conventional in their construction and operation and as such, need not be discussed in significant detail herein. Reference may be made to a variety of publications for a more complete understanding of the construction and operation of the conventional components of the power tool 100, including U.S. Pat. Nos. 6,431,289; 7,314,097; 5,704,433; and RE37,905, the disclosures of which are hereby incorporated by reference as if fully set forth in detail herein.

Figure 4A:
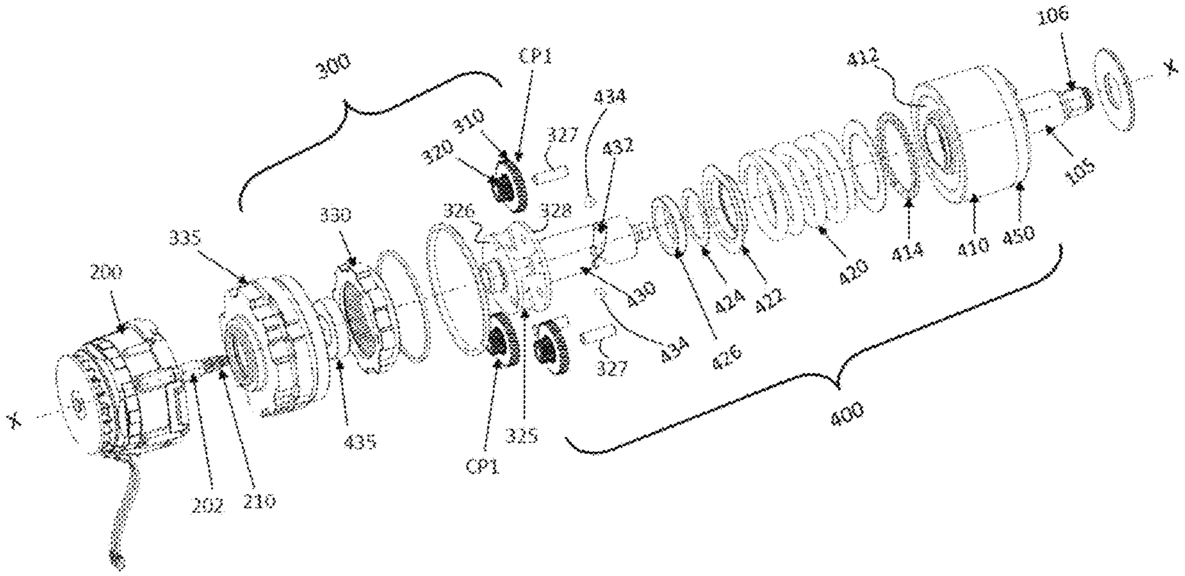
FIG. 4A is an exploded view of a motor, the transmission, and the impact mechanism of the impact tool of FIG. 1, according to an embodiment.
Figure 4B:
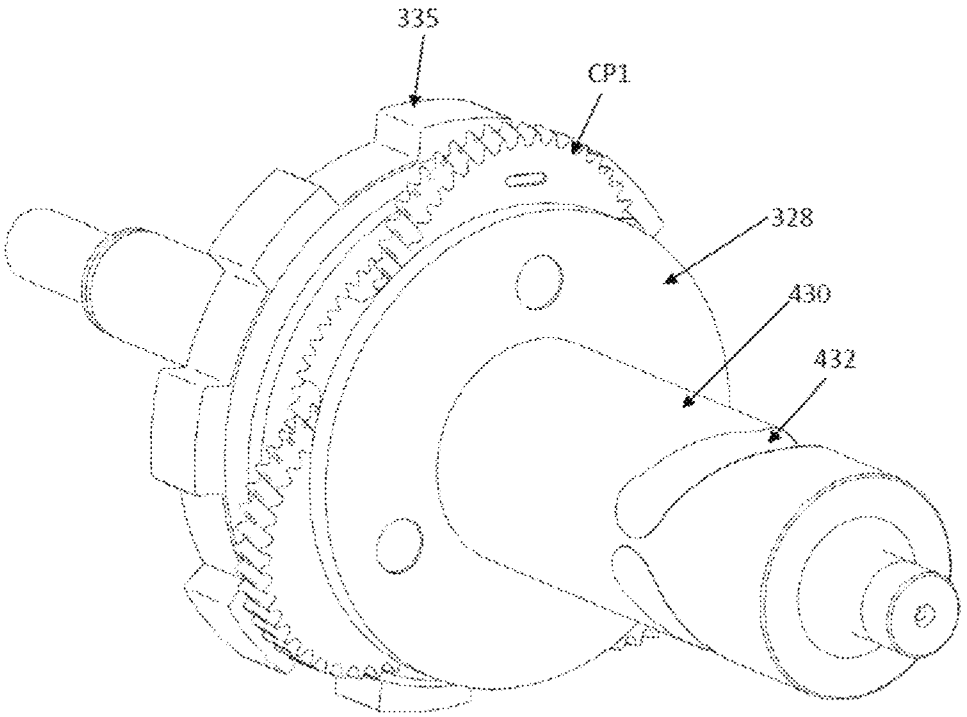
FIG. 4B is an assembled view of the transmission of FIG. 1, according to an embodiment.
Figure 5:
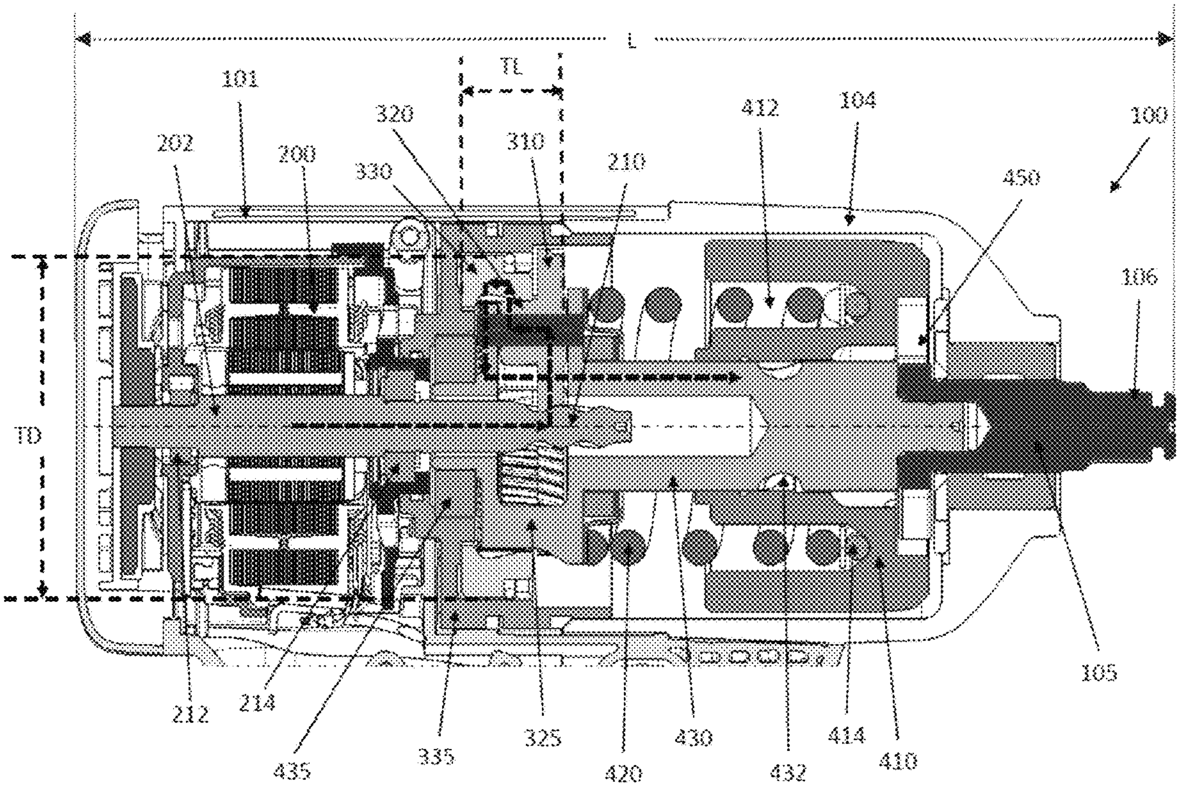
FIG. 5 is a partial cross section view of the impact tool of FIG. 1, the transmission being in the first configuration of FIG. 4C, according to an embodiment.

Referring also to FIGS. 3, 4A, and 5, in one implementation, the transmission 300 is a planetary transmission including a pinion or sun gear 210, one or more planet gears CP1 (see FIG. 4A), a ring gear 330, and a planet carrier 325 that carries the planet gears CP1 via pins 327. The pinion or sun gear 210 is coupled to a motor output shaft 202 of the motor 200 and extends along the tool axis X-X. The motor output shaft 202 is supported on the bearings 212 and 214 disposed at the rear end of the shaft and at the front end of the shaft, respectively. The one or more planet gears CP1 surround and have teeth that mesh with the teeth on the sun gear 210. The ring gear 330 may be fixed to a gear housing 335 (see FIGS. 2 and 4A). The ring gear 330 is centered on the tool axis X-X with its internal teeth meshing with the teeth on the planet gears CP1. The planet gears CP1 are rotatably carried by the planet carrier 325 via pins 327. A cam shaft 430 extends axially forward from the planet carrier 325 and is configured to rotate together with the planet carrier 325. When the motor 200 is energized, the sun gear 210 rotates about the axis X-X, causing the planet gears CP1 to rotate about the axes of the pins 327. Because the ring gear 330 is stationary, the planet gears CP1 also orbit around the sun gear 210, causing the planet carrier 325 and cam shaft 430 rotate about the axis X-X at a reduced rotational speed relative to the sun gear 210. Thus, the transmission assembly 300 transmits an input power from the motor 200 to the cam shaft 430 at a reduced speed relative to the rotational speed of the motor output shaft 202.

In the present example, the planet gears CP1 includes a first planet gear 310 and a second planet gear 320. In an embodiment, the first and second planet gears 310 and 320 are unitarily formed (i.e., each of the planet gears of the first planet gear 310 is integrally formed with an associated one of the second planet gear 320) and will be referred to herein as a compound planet gear CP1. Those of skill in the art will appreciate from this disclosure, however, that the first planet gear 310 and second planet gear 320 can be separately formed.

The first planet gear 310 has a first pitch diameter and the second planet gear 320 has a second pitch diameter that is different than the first pitch diameter. In an embodiment, the first pitch diameter is greater than the second pitch diameter.

The compound planet gears CP1 (i.e., the planet gears of the first and second planet gears 310 and 320) can be distributed or circumferentially spaced apart in any desired manner. The compound planet gears CP1 are mounted are spaced apart in the example provided by spacing of 120 degrees between the each of the compound planet gears CP1. Those of skill in the art will appreciate that other spacing could be employed and as such, the scope of the present disclosure will not be understood to be limited to the particular spacing or combination of spacing that are disclosed in the particular example provided.

Figure 4C:
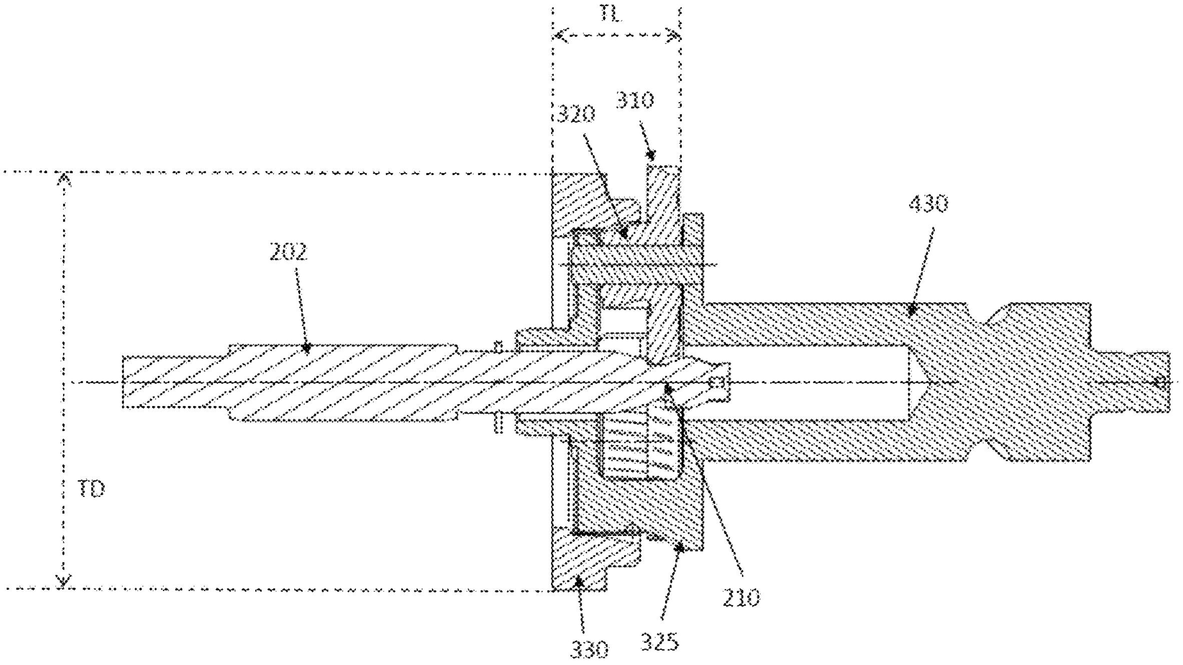
FIG. 4C is a schematic view of the transmission including planet gears in a first configuration having a ring gear fixed and the planet carrier rotatably coupled to a cam carrier, according to an embodiment.

FIG. 5 illustrates a first configuration of the planetary transmission configured to transmit rotational motion from the motor output shaft 202 to the cam shaft 430. As shown, the planetary transmission 300 includes the sun gear 210 rotatably driven by the motor output shaft 202, the planet carrier 325 rotatably driving the cam shaft 430, and the ring gear 330 rotationally fixed relative to the tool housing. The first planet gear 310 is mounted to the planet carrier 325 and meshed with the sun gear 210 but not meshed with the ring gear 330. The second planet gear 320 is mounted to the carrier and meshed with the ring gear 330 but not meshed with the sun gear. Such compact arrangement enables high speed-reduction ratio (e.g., greater than 14:1) within a compact space (e.g., TL less than 40 mm and TD less than 150 mm). In an embodiment, the transmission diameter TD is defined as outer periphery of the ring gear 330, and the transmission length TL is defined as a distance between a rear face of the ring gear 330 and front face of the first planet gear 310 (see FIGS. 4C, and 5). In this example, the planetary transmission is a single stage transmission having a single overall speed reduction ratio.

In an embodiment, the ring gear 330 is rotationally fixed relative to the gear housing 335 (see also FIGS. 2 and 3), which is rotationally fixed relative to the tool housing. In an embodiment, the ring gear 330 includes splines or lugs at an outer periphery that are configured to engage with corresponding slots in the gear housing 335 (see FIGS. 2 and 4A) thereby causing the ring gear 330 to be rotationally fixed. In an embodiment, the ring gear 330 may be integrally formed with the gear housing 335 that is axially and rotationally fixed to the tool housing and enveloping the planetary transmission.

In an embodiment, the planet carrier 325 includes a rear plate 326, a front plate 328, and pins 327 extending between the rear plate 326 and the front plate 328. The planet carrier 325 supports, on the pins 327, the first planet gear 310 and the second planet gear 320 with the second planet gear 320 adjacent the rear plate and the first planet gear 310 adjacent the front plate. In an embodiment, the first planet gear 310 and 320 are fixedly coupled to the pins 327. In an embodiment, the rear plate 326 has an annular structure and is nested at least partially inside the ring gear 330. In an embodiment, the rear plate 326 is coupled to a rear hub supported by a rear bearing 435 (also referred as a cam bearing in an embodiment) that is nested at least partially inside the ring gear 330.

In an embodiment, the planet carrier 325 may be modified to remove the rear plate 326, the front plate 328, or both to further make the transmission 300 compact in size. Accordingly, the pins 327 may be supported by the rear plate 326 or the front plate 328. In an embodiment, the planet carrier 325 may include a pin supported by the gear housing 335, with no rear plate 326 and no front plate 328.

In an embodiment, the planetary transmission 300 has a single overall speed reduction ratio from the motor output shaft 202 to the cam shaft 430. The overall speed reduction ratio corresponds to a product of a speed reduction between the sun 210 and the first planet gear 310 and a speed reduction between the second planet gear 320 and the ring gear 330. In an embodiment, the first pitch diameter and the second pitch diameter are such that the overall speed reduction ratio is at least 14:1. In an embodiment, the first pitch diameter and the second pitch diameter are such that the overall speed reduction ratio is at least 20:1. The planetary transmission 300 discussed herein provides a better output torque, power, and speed reduction in a smaller overall package compared to existing impact tools.

According to the present disclosure, the compound planet gear CP1 enables a speed reduction ratio of greater than 14:1 in a single stage using compound-planet gears 310 and 320 in an impact tool. Existing impact tools can only achieve a lower speed reduction ratio in a single stage and/or require a multi-stage speed reduction via two or more planetary gear stages to achieve a higher speed reduction ratio. However, such multi-stage planetary transmissions increases a size (e.g., length) of the tool, which may be undesirable.

According to the present disclosure, a higher speed-reduction ratio is achieved within a more compact sized tool, or within an existing power tools such as an impact drivers with negligible increase in size. For example, a speed reduction of more than 14:1 can be achieved within a tool having an outer diameter TD of the transmission less than or equal to approximately 150 mm and a length TL of the transmission less than or equal to approximately 40 mm. These shorter lengths are achieved, e.g., by nesting the planet gears 310 and 320, the ring gear 330 and the sun gear 210 in a compact manner. The nested arrangement causes full overlapping or partial overlapping of component along a length of the components that effectively reduces the transmission length thereby keeping the transmission length to less than or equal to approximately 40 mm. Additionally, the radial dimensions are so designed that a speed reduction of greater than 14:1 is achieved within the compact space of less than 40 mm in length and less than 150 mm in diameter. In an embodiment, the volume of the planetary transmission is less than volume of less than 60 $cm^2$.

Using the transmission 300 of the present disclosure with a higher speed reduction ratio, the compact impact tool also can deliver a higher torque and power output at a reduced speed compared to existing impact tools. Such higher torque and power output may be beneficial to drive in fasteners quickly into tough objects like concrete, bricks, stone, etc. Additionally, at the high speed-reduction ratio (e.g., greater than 14:1), a higher overall tool efficiency can be achieved which enables the impact driver to use less power from the battery. As such, with the high speed-reduction ratio (e.g., greater than 14:1), the compact sized impact tool can deliver higher torque outputs.

In addition, the first planet gear 310, the second planet gear 320, the ring gear 330, or a combination thereof have helical teeth. In an embodiment, the helical teeth on the first planet gear 310 are at a first helix angle and the helical teeth on the second planet gear 320 are at a second helix angle that is less than the first helix angle. In an embodiment, first teeth of the first planet gear 310 have a larger tooth size than second teeth of the second planet gear 320. In an embodiment, the helical teeth allow higher force transmission experienced during the high speed-reduction within a compact size. Advantage of using such helical teeth includes, but not limited to, preventing a tooth failure during high speed-reduction, and a less noisy transmission (e.g., compared to spur gears). Thus, even within the transmission length TL of less than 40 mm a greater speed reduction (e.g., greater than 14) may be achieved with improved strength, and less noise. However, the present disclosure is not limited to helical gear. For example, a person of ordinary skill in the art may use spur gears or other profiled gears of appropriate strength, diameter and number of teeth so that the transmission ration is greater than 14:1. In an embodiment, the spur gear may provide higher transmission efficiency compared to the helical gear.

In an embodiment, the first planet gear 310 and the second planet gear 320 may have any desired number of teeth n1 and n2, respectively. The ratio of a number of teeth n1 and n2 may or may not be an integer. In an embodiment, the number of teeth is based on the pitch diameter and pitch of the respective gear. In an embodiment, it may be desirable in some instance to configure the first planet gear 310 such that the number n1 of their teeth is a multiple of the number n2 of the teeth of the second planet gear 320. In this regard, a ratio of the number n1 to the number n2 can yield an integer (e.g., 2, 3). This can be desirable as it can eliminate the need to time the planet gears to one or more other geared elements, as well as permit the compound planet gears CP1 to be identically formed.

As shown in FIG. 5, the length of the ring gear 330 partially overlaps with the length of the second planet gear 320. Furthermore, the annular structure of the planet carrier 325 enables partial overlap with the ring gear 330. Additionally, the annular structure of the ring gear 330 and the planet carrier 325 enables nesting of the cam bearing 435 at least partial along the length of the ring gear 330. The first and the second planet gears are nested inside a space between the rear plate 326 and the front plate 328 of the planet carrier 325. In an embodiment, more than 80% of the length of each component overlaps with the length of one or more other components of the transmission 300.

In an embodiment, the overall length of the transmission and the tool may also be reduced by nesting additional components of the impact tool. For example, the rear carrier plate 326 may have an annular structure that can be received over the motor output shaft 202 of the motor 200. The rear carrier plate 326 may include a first portion and a second portion such that the first portion can be abutted against a rear surface of the second planet gear 320 to inhibit undesired axial movement of the planet gears 310 and 320. The second portion can be relatively smaller in diameter than the first portion and can be configured to have a first bearing aperture to receive the motor output shaft 202. In an embodiment, the diameter of the second portion is small enough that a front motor bearing (or a first bearing) 214 that can support the motor output shaft 202 is placed outside the planet carrier 325. In an embodiment, the diameter of the second portion is small enough so that the planet carrier bearing 435 can be received over the second portion of the rear carrier plate 326. In an embodiment, the planet carrier bearing 435 also serves as support for a part of the impact mechanism 400, e.g., part of the cam shaft 430. Configuration in this manner nests additional components of the tool 100 such as components of the motor 200 or the impact mechanism 400 that reduces the overall length of the tool.

In FIG. 5, the second planet gear 320 is positioned axially rearward of the first planet gear 310 so that power flows non-sequentially through the planetary transmission. Dotted lines mark the power flow path. For example, the power flows from the motor 200 to the sun gear 210 to the first planetary gear 310 to the second planetary gear 320 to the ring gear 330 and finally to the planet carrier 325 which is coupled to the cam shaft 430.

Figure 6:
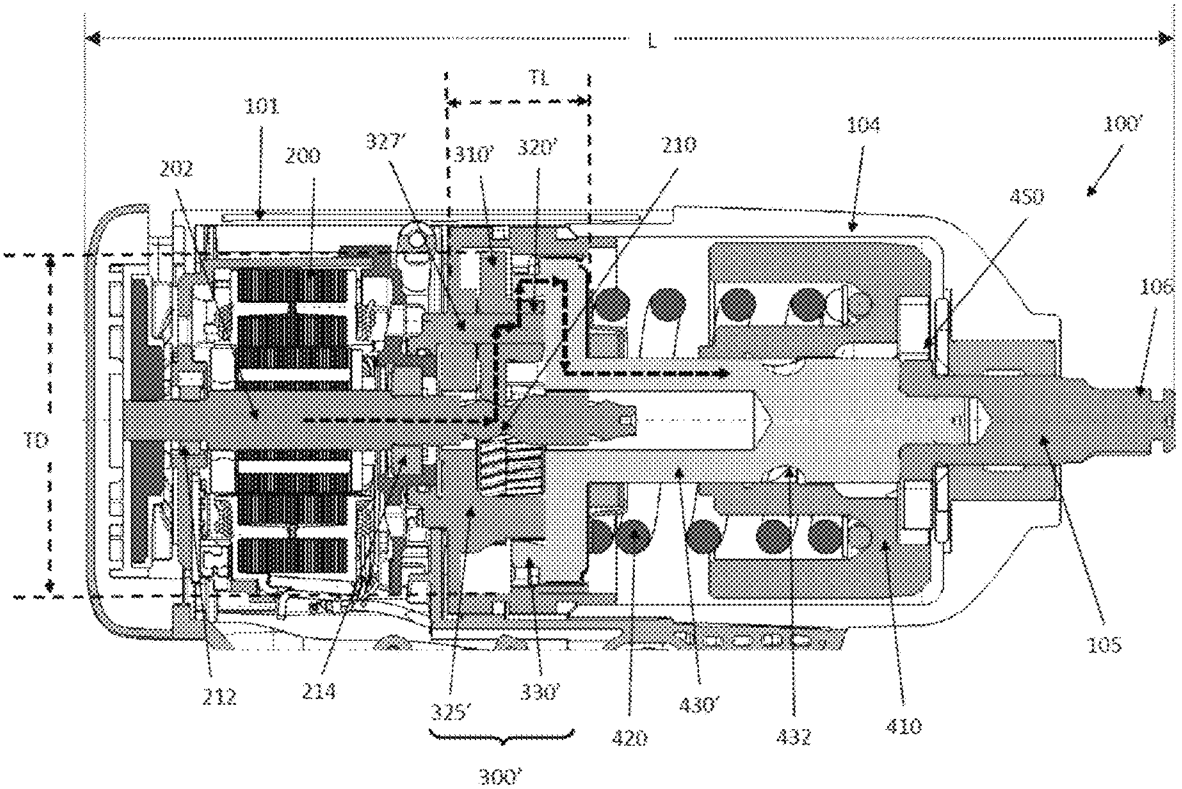
FIG. 6 is a partial cross section view of the impact tool of FIG. 1, the transmission being in a second configuration having ring gear rotatably connected to a cam carrier and planet carrier being fixed, according to an embodiment.

FIG. 6 illustrates a second configuration of a planetary transmission that can be employed with an impact tool 100' similar to the impact tool 100 described above. The impact tool 100' includes a transmission 300', which is a planetary transmission including a pinion or sun gear 210, one or more planet gears CP1' (similar to planet gear CP1 discussed herein), a ring gear 330', and a planet carrier 325' that carries the planet gears CP1' via pins 327'. In the transmission 300', the orientation of the planet gear CP1' in a reversed as compared with the orientation of the planet gear CP1 described in FIG. 5. For example, a first planet gear 310' is disposed rearwardly and the second planet gear 320' having a smaller diameter compared to the first planet gear 310' is disposed towards a front portion of the transmission.

As discussed earlier, the first and second planet gears 310' and 320' are unitarily formed, or can be separately formed but rotationally fixed with each other. The first planet gear 310' has a first pitch diameter and the second planet gear 320' has a second pitch diameter that is different than the first pitch diameter. In an embodiment, the first pitch diameter is greater than the second pitch diameter. The compound planet gears CP1' can be distributed or circumferentially spaced apart in any desired manner (e.g., having a spacing of 120 degrees between the each of the compound planet gears CP1'). In an embodiment, the second planet gear 320' is positioned axially forward of the first planet gear 310' so that power flows sequentially through the planetary transmission. For example, power flows sequentially from the sun gear 210 to the first planet gear 310' to the second planet gear 320' to the ring gear 330' and to the output spindle 105.

The first planet gear 310' surround and have teeth that mesh with the teeth on the sun gear 210. The ring gear 330' is centered on the tool axis X-X with its internal teeth meshing with the teeth on the second planet gear 320'. The ring gear 330' is rotatably coupled to a cam shaft 430'. The planet gears CP1' are rotatably carried by the planet carrier 325' via pins 327'. The cam shaft 430' extends axially forward from the ring gear 330' and is configured to rotate together with the ring gear 330'. Such compact arrangement enables high speed-reduction ratio (e.g., greater than 14:1) within a compact space (e.g. TL less than 40 mm and TD less than 150 mm). In an embodiment, the transmission diameter TD is defined as outer periphery of the ring gear 330', and the transmission length TL is defined as a distance between a rear face of the first planet gear 310' and a front face of the ring gear 330' (see FIG. 6). In this example, the planetary transmission is a single stage transmission having a single overall speed reduction ratio.

When the motor 200 is energized, the sun gear 210 rotates about the axis X-X, causing the planet gears CP1' to rotate about the axes of the pins 327'. Because the planet carrier 325' is fixed relative to the gear housing 335, the rotation of the planet gear CP1' causes the ring gear 330' and the cam shaft 430' to rotate about the axis X-X at a reduced rotational speed relative to the sun gear 210. Thus, the transmission assembly 300' transmits an input power from the motor 200 to the cam shaft 430' at a reduced speed relative to the rotational speed of the motor output shaft 202.

In an embodiment, to fix the planet carrier 325', a structure of the planet carrier 325 (of FIGS. 4A and 5 discussed earlier) may be modified. The planet carrier 325' may be configured to support the compound planet CP1' on the pins 327'. In an embodiment, the planet carrier 325' may not include the rear plate 326 and the front plate 328, and the pin 327' may be directly coupled to the fixed gear housing 335. In an embodiment, the planet gears 310' and 320' are rotatably mounted on the pins 327'. As such, even when the plant carrier 325' is fixed, the planet gears 310' (and 320') can rotate in place when driven by the sun gear 210.

In an embodiment, the ring gear 330' is disposed in axially forward direction and directly coupled with the cam shaft 430'. In an embodiment, the cam bearing used to rotationally support the cam shaft 430' may disposed in a forwardly direction after the ring gear 330'. In an embodiment, the ring gear 330' may partially overlap with the cam bearing. In other words, the cam bearing may be partially or fully nested inside the ring gear 330'.

In an embodiment, the components of the transmission 300' in FIG. 6 are also configured to provide an overall speed reduction ratio of at least 14:1 (e.g., at least 20:1) and have an outer diameter TD of less than 150 mm and a length TL of less than 40 mm. In an embodiment, the transmission volume may be less than 60 $cm^2$.

Following calculations provide example speed reduction ratios achieved by the planetary transmission 300/300' employing the compound planetary CP1/CP1' sized and compactly arranged as described herein. FIGS. 5 and 6 illustrate two different compact arrangements, each providing the speed reduction ratio of greater than 20:1 in the following examples. The speed reduction ratio calculations below are only exemplary to illustrate the benefits of the present disclosure, and does not limit the scope of the present disclosure. The speed reduction ratio calculation below is based on a number of teeth for simplicity. For example, the sun gear 210 may have 8 teeth, the first planet gear 310 may have 42 teeth, the second planet gear 320 may have 21 teeth, and the ring gear may have 86 teeth. Typically, the number of teeth is also indicative a pitch diameter of the gears. A similar computation may be performed based on pitch diameters of the respective gear within the planetary gears.

In an embodiment, referring to FIG. 5, where the ring gear 330 is fixed and output is provided by the planet carrier 325, the overall speed reduction ratio (SRR) is 22.5:1, which can be computed as below:

$$SRR = 1 + \frac{\text{Ring teeth}}{\text{Sun teeth}} * \frac{\text{Planet teeth}_{Sun\ mesh}}{\text{Planet teeth}_{Ring\ mesh}} = 1 + \frac{86}{8} * \frac{42}{21} = 22.5$$

In an embodiment, referring to FIG. 6, where the planet carrier 325' is fixed and an output is provided by the ring gear 330', the overall speed reduction ratio is 21.5:1, which can be computed as below:

$$SRR = \frac{\text{Ring teeth}}{\text{Sun teeth}} * \frac{\text{Planet teeth}_{Sun\ mesh}}{\text{Planet teeth}_{Ring\ mesh}} = \frac{86}{8} * \frac{42}{21} = 21.5$$

On the other hand, when a traditional transmission used in impact drivers employs similar number of teeth for sun gear (e.g., 8 teeth) and ring gear (e.g., 92 teeth) as above, the speed reduction is substantially lower than computed above. For example, the traditional transmission where a ring gear is fixed and an output is provided by a planet carrier the overall speed reduction ratio is 12.5:1, which can be computed as below:

$$SRR = 1 + \frac{\text{Ring teeth}}{\text{Sun teeth}} = 1 + \frac{92}{8} = 12.5$$

Similarly, traditional transmission used in impact drivers, where a planet carrier is fixed and an output is provided by a ring gear, the overall speed reduction ratio is 11.5:1, which can be computed as below:

$$SRR = \frac{\text{Ring teeth}}{\text{Sun teeth}} = \frac{92}{8} = 11.5$$

It can be noted in the above calculations that although the ring to sun gear ratio (e.g., 86/8) is lower in the planetary transmission using the compound gear CP1 compared to the traditional transmission (e.g., 92/8), the overall speed reduction ratio of the present transmission is substantially greater (e.g., 22.5:1 is greater than 12.5:1).

In the illustrated embodiment, only a single planetary stage is shown. It should be understood that the transmission may include multiple planetary stages that may provide for multiple speed reductions, and that each stage can be selectively actuated to provide for multiple different output speeds of the planet carrier 325. Further, the transmission may include a different type of gear system such as a parallel axis transmission or a spur gear transmission.

Impact Assembly

Referring to FIGS. 4A, 5, and 6, the impact mechanism 400 may be similar to that described in U.S. Patent Application Publication No.: 20190/0344411, which is incorporated herein in its entirety by reference. For example, the impact mechanism 400 includes the cam shaft 430 extending along the tool axis X-X and fixedly coupled to the cam shaft 430. In an embodiment, the cam shaft 430 may be directly coupled to the planet carrier 325 so that they rotate together. In an embodiment, the cam shaft 430 may be directly coupled to the ring gear 330 so that they rotate together. Received over the cam shaft 430 is a cylindrical hammer 410 that is configured to move rotationally and axially relative to the cam shaft 430. The cam shaft 430 also has a front end of smaller diameter that is rotatably received in an axial opening in the output spindle 105. Fixedly coupled to a rear end of the output spindle 105 is the anvil 450 having two radial projections. The hammer 410 has two hammer projections on its front end that lie in the same rotational plane as the radial projections of the anvil 450 so that each hammer projection may engage a corresponding anvil projection in a rotating direction.

Formed on an outer wall of the cam shaft 430 is a pair of rear-facing V-shaped cam grooves 432 with their open ends facing toward the rear end portion of the housing 101. A corresponding pair of forward-facing V-shaped cam grooves (not shown) is formed on an interior wall of the hammer 410 with their open ends facing toward the front end portion of the housing 101. A ball 434 is received in and rides along each of the cam grooves 432 to couple the hammer 410 to the cam shaft 430.

A compression spring 420 is received in a cylindrical recess 412 in the hammer 410 and abuts a forward face of the planet carrier 325 (FIG. 5) or the ring gear 330' (FIG. 6) of the transmission 300. In an embodiment, at a front end, the spring 420 rests against a washer and bearing 414 disposed at the front end within the recess 412. In an embodiment, at the rear end, the spring 420 may be coupled to an annular spring mounting plate 422. In an embodiment, a spacer 426 and a washer 424 may be included between the mounting plate 422 and a forward face of the transmission 300. In an embodiment, the spacer 426 prevents the spring 420 from directly resting against the front plate 328 of the planet gear carrier 325. In an embodiment, the spacer 426 may be partially nested inside the annular portion of the spring mounting plate 422. In an embodiment, the spacer 426 enables the spring 420 to be of a larger diameter than the front plate 328 of the carrier 325 that allows, for example, a higher compression force to be exerted on the hammer 410, which in turn generates a higher impact force on the anvil 450. The spring 420 biases the hammer 410 toward the anvil 450 so that the hammer projections engage the corresponding anvil projections.

At low torque levels, the impact mechanism 400 transmits torque to the output spindle 105 in a continuous rotary mode. In the continuous rotary mode, the compression spring 420 maintains the hammer 410 in its most forward position so that the hammer projections continuously engage the anvil projections. This causes the cam shaft 430, the hammer 410, the anvil 450 and the output spindle to rotate together as a unit about the tool axis X-X so that the output spindle 105 has substantially the same rotational speed as the cam shaft 430.

As the torque increases to exceed a torque transition threshold, the impact mechanism 400 transmits torque to the output spindle 105 in an impact mode. In the impact mode, the hammer 410 moves axially rearwardly against the force of the spring 420. This decouples the hammer projections from the anvil projections. Thus, the anvil 450 continues to spin freely on its axis without being driven by the motor 200 and transmission 300, so that it coasts to a slightly slower speed. Meanwhile, the hammer 410 continues to be driven at a higher speed by the motor 200 and transmission 300. As this occurs, the hammer 410 moves axially rearwardly relative to the anvil 450 by the movement of the balls 434 rearwardly in the V-shaped cam grooves 432. When the balls 434 reach their rearmost position in the V-shaped cam grooves 432, the spring 420 drives the hammer 410 axially forward with a rotational speed that exceeds the rotational speed of the anvil 450. This causes the hammer projections to rotationally strike the anvil projections, imparting a rotational impact to the output spindle 105. This impacting operation repeats as long as the torque on the output spindle 105 continues to exceed the torque transition threshold.

Thus, from the above, it will be appreciated that the present disclosure provides various embodiments. In one embodiment, there is provided an impact power tool that includes the housing 101 having a rearward portion and a forward portion, the motor 200 disposed in the rearward portion of the housing 101 and having a motor output shaft 202 (see FIGS. 1, 2, 5, and 6). The output spindle 105 disposed at least partially in the forward portion of the housing 101. The rotary impact assembly 400 is disposed in the forward portion of the housing 101 and including the cam shaft 430. The hammer 410 is carried by the cam shaft 430, the hammer spring 420 acts on the hammer 410, and the anvil 450 is coupled to the output spindle 105. The rotary impact assembly 400 is configured to transmit rotational motion with intermittent rotational impacts from the cam shaft to the output spindle. In an embodiment, a planetary transmission 300 is configured to transmit rotational motion from the motor output shaft 202 to the cam shaft 430 at a single overall speed reduction ratio (SRR). For example, SRR greater than 14:1.

In an embodiment, for example referring to FIG. 5, the planetary transmission 300 includes the sun gear 210 rotatably driven by the motor output shaft 202, the planet carrier 325 rotatably drives the cam shaft 430, the ring gear 330 rotationally fixed relative to the tool housing 101, the first planet gear 310 mounted to the planet carrier 325 and meshed with the sun gear 210 but not meshed with the ring gear 330 and a second planet gear mounted to the carrier 325 and meshed with the ring gear 330 but not meshed with the sun gear 210. The first planet gear 310 has a first pitch diameter P1 and the second planet gear 320 has a second pitch diameter P2 that is different than the first pitch diameter.

In an embodiment, for example, referring to FIG. 6, the planetary transmission 300' includes the sun gear 210 coupled to the motor output shaft 202, the first planet gear 310' with a first pitch diameter P1 meshed with the sun gear 210, the second planet gear 320' with a second pitch diameter P2 that is different than the first pitch diameter, the planet carrier 325' that carries both the first planet gear 310' and the second planet gear 320' and that is rotationally fixed relative to the tool housing 101, the rotatable ring gear 330' is meshed with the second planet gear 320' and is coupled to the cam shaft 430' to provide rotational output from the transmission to the cam shaft 430'.

In an embodiment, the above-described planetary transmissions enable achievement of a higher speed reduction, a greater transmission of output torque, and a more compact construction than existing impact tools. For example, in the above embodiments, the transmission may enable the power tool to have a speed reduction ratio of at least 14:1 (e.g., a speed reduction ratio of at least 20:1) to achieve a maximum tightening torque of at least 1200 ft-lbs. (with a maximum breakaway torque of at least 1500 ft-lbs) in a power tool that has an overall length L of the tool housing of at most 215 mm, an overall girth G of at most 90 mm, and an overall weight (without the battery pack) of at most 7.5 lbs. Stated more generally, a ratio of maximum tightening torque to tool length L may be at least 5.5 ft-lbs/mm, a ratio of maximum tightening torque to tool housing volume (length L×girth G) may be at least 0.06 ft-lbs/mm$^2$, and a ratio of maximum tightening torque to tool weight may be at least 160 ft-lbs/lb. Also, as noted above, these torque transmission levels may be achieved when the overall diameter TD of the transmission is at most 150 mm, the overall length of the transmission TL is at most 40 mm, and the overall volume of the transmission is less than 60 cm$^2$. Stated differently, a ratio of maximum tightening torque to transmission diameter may be at least 8.0 ft-lbs/mm, a ratio of maximum tightening torque to transmission length may be at least 30 ft-lbs/mm, and a ratio of maximum tightening torque to transmission volume may be at least 20 ft-lbs/cm$^2$.

In one embodiment, a power tool includes a housing, a motor, an output spindle, a rotary impact assembly, and a single stage compound planetary transmission. The housing includes a rearward portion and a forward portion. The motor is disposed in the rearward portion of the housing and includes a motor output shaft. The output spindle is disposed at least partially in the forward portion of the housing. The rotary impact assembly is disposed in the forward portion of the housing. The rotary impact assembly includes a cam shaft, a hammer carried by the cam shaft, and an anvil coupled to the output spindle. The rotary impact assembly is configured to transmit rotational motion with intermittent or periodic rotational impacts from the cam shaft to the output spindle. The structure, configuration and operation of the power tool, the housing, the motor, the output spindle, the rotary impact assembly, and the single stage compound planetary transmission of this embodiment are described in detail in throughout this specification, and will not be described here again.

The motor is controlled to run at a speed between approximately 15000 rotations per minute (rpm) and approximately 32000 rpm. The hammer has an inertia between approximately 400 kilogram millimeter squared (kg·mm$^2$) and approximately 3000 kg·mm$^2$. The compound planet gear is carried by the planet carrier to achieve a gear reduction ratio between approximately 14:1 and approximately 30:1. The power tool is configured to achieve a fastening torque of at least approximately 900 foot-pounds (ft-lbs) in a time of less than approximately 3.5 seconds(s). The power tool is configured to achieve the fastening torque of at least approximately 900 ft-lbs with an input energy of less than approximately 2500 Joules (J). The power tool is configured to achieve the fastening torque that is at least approximately 1200 ft-Ibs and a breakaway torque that is at least approximately 1700 ft-lbs. The beat rate of the hammer is between approximately 1500 beats per minute and approximately 2400 beats per minute.

The power tool further comprises a battery that has a nominal voltage of at least approximately 18 Volts (V), a capacity of at least approximately 5 Ampere hour (Ah) and an impedance of less than or equal to approximately 50 milliOhms (mOhms). A diameter of the transmission is between approximately 40 millimeters (mm) and approximately 200 mm. A length of the transmission is between approximately 15 millimeters (mm) and approximately 60 mm. The first planet gear has a first pitch diameter and the second planet gear has a second pitch diameter that is less than the first pitch diameter The power tool may be interchangeably referred to as an impact power tool or an impact tool. The planetary transmission may be interchangeably referred to as a planetary gear transmission, an epicyclic transmission, or an epicyclic gear transmission. The planet gear may be interchangeably referred to as a peripheral gear or a peripheral pinion gear. The sun gear may be interchangeably referred to as a pinion gear, a center pinion gear, an external gear, a central external gear or a center external gear. The ring gear may be interchangeably referred to as an internal gear, an annulus gear, or a stationary gear. The hammer may be interchangeably referred to as an impactor or a striking mass. The anvil may be interchangeably referred to as an output shaft with lugs (or an output shaft with dogs). The output spindle may be interchangeably referred to as an output member.

The impact tool of the present patent application is configured and designed for heavier duty applications (e.g., larger fasteners that require more torque). Because this impact tool is designed for those applications, the impact inertia of this impact tool may be configured to be higher (e.g., in the range between approximately 400 kg·mm$^2$ and approximately 3000 kg·mm$^2$ or, in one embodiment, approximately 640 kg·mm$^2$) than the prior art impact tools. The impact inertia of the prior art impact tools is usually around the 300 kg·mm$^2$. That is, the impact inertia of the impact tool of the present patent application may be approximately double the impact inertia of the prior art impact tools so as to get more efficiency in the torque transmission. And, in order to utilize the high impact inertia (e.g., in the range between approximately 400 kg·mm$^2$ and approximately 3000 kg·mm$^2$ or, in one embodiment, approximately 640 kg·mm$^2$), and maintain the same or similar kinetic energy (as that of the prior art impact tools), increasing the kinetic energy necessarily increases the input energy as well, the beat rate needs to be reduced. The motor speed of the impact tool of the present patent application may be in the range between approximately 15000 rpm and approximately 32000 rpm. For example, as shown in TABLES below, the motor speed of the impact tool of the present patent application may be approximately 21262.5, approximately 22995, or approximately 23073.75 rpm, while the motor speeds of the prior art impact tools may be 12100, 12600, or 12600 rpm. Also, for the motor of the impact tool of the present patent application to run at these higher and more efficient motor speeds while having a slower beat rate, a higher gear reduction ratio is needed. For example, the gear ratio or the gear reduction ratio of the impact tool of the present patent application may be between approximately 14:1 and approximately 30:1 (e.g., approximately 22.5:1, in one embodiment, as shown in the TABLES below), while the gear ratio of the prior art impact tools may be 11:1 or 12:1.

Thus, with the (higher) gear reduction ratio in the range between approximately 14:1 and approximately 30:1, with the (higher) impact inertia in the range between approximately 400 kg·mm$^2$ and approximately 3000 kg·mm$^2$, and with the (higher) motor speed in the range between approximately 15000 rpm and approximately 32000 rpm, the impact power tool of the present patent application is configured to achieve a fastening torque of at least approximately 900 ft-lbs in a time of less than approximately 3.5 s and with an input energy of less than approximately 2500 J as will described in detail below. The impact tool may be made bigger (i.e., the actual physical structure of the hammer) to provide the impact tool with higher impact inertia (e.g., approximately 640 kg·mm$^2$).

Figure 7:
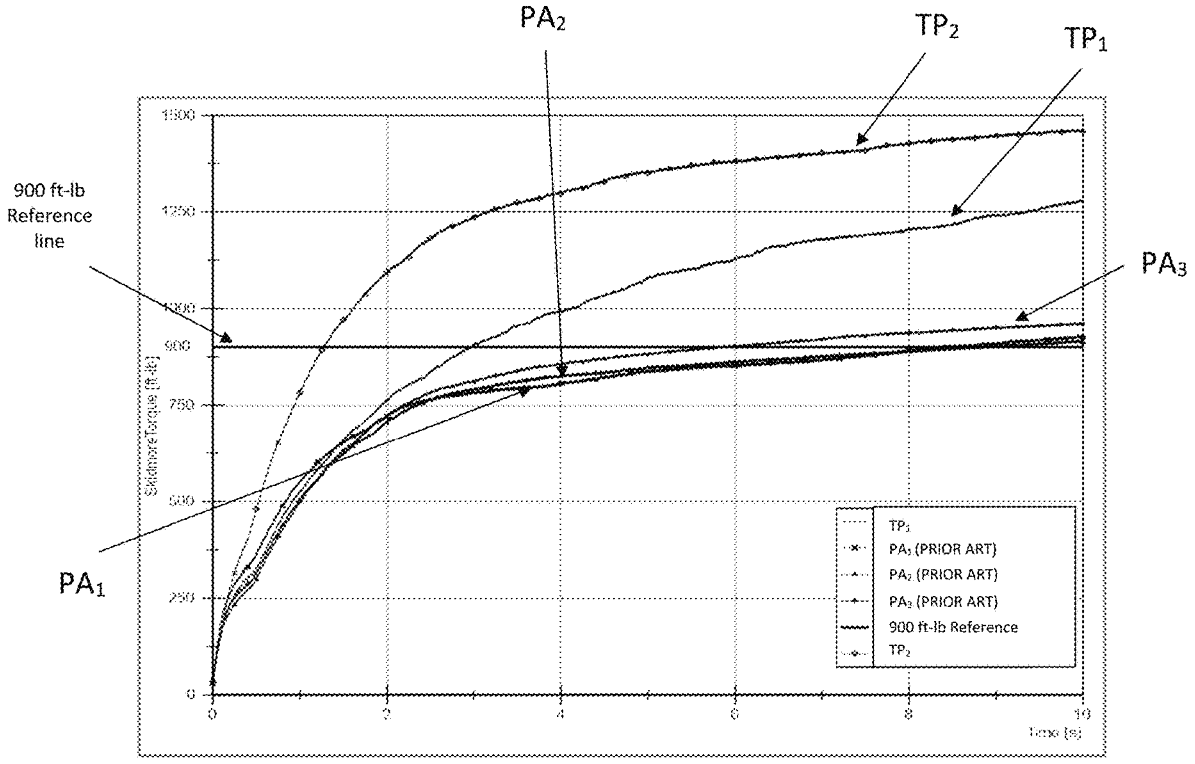
FIG. 7 is a graphical representation of a comparison of torque (vs time) curves for two impact tools according to embodiments of the present patent application with torque (vs time) curves for three prior art impact tools, wherein a 900 ft-lbs reference line is also shown for sake of clarity and ease of understanding.

FIG. 7 is a graphical representation of a comparison of torque vs time curves for two embodiments of impact tools of the present patent application (labeled as $TP_1$ and $TP_2$) with torque vs time curves for three prior art impact tools (labeled as $PA_1$, $PA_2$, and $PA_3$). A 900 ft-lbs reference torque line is also shown for sake of clarity and ease of understanding. The torque vs time curves may also be interchangeably referred to as torque-time profiles. The torques may also be referred to as Skidmore torques because they are determined using a known Skidmore torque test rig. FIGS. 8-14 show graphical representations of both torque-time profiles and energy-time profiles for each impact tools. For example, FIGS. 12-14 each show the torque-time and energy-time profiles for each prior art impact tools, while FIGS. 8-11 show the torque-time and energy-time profiles for the impact tools of the present patent application. The energy-time profiles may also be interchangeably referred to as energy vs time curves.

The torques (e.g., measured in ft-lbs) are shown on the left hand side Y-axis of the graphs in FIGS. 7-14 and the times (i.e., measured in s) are on the X-axis of the graphs in FIGS. 7-14. The energies (i.e., measured in Joules (J)) are shown on the right hand side Y-axis of the graphs in FIGS. 8-14.

For example, two exemplary impact tools according to embodiments of the present patent application may include tool product 1, $TP_1$ and tool product 2, $TP_2$. The tool product 1, $TP_1$ and the tool product 2, $TP_2$ may use one of the following batteries: battery, $B_1$ or battery, $B_2$. The battery, $B_1$ may be a DEWALT® DCB205 20 Volts (V) MAX 5 Ampere Hour (Ah) battery. The battery $B_2$ may be a DEWALT® POWERSTACK™ DCBP520 20V MAX 5 Ah battery. The battery, $B_1$ and the battery, $B_2$ each may have a nominal voltage of at least approximately 18 V, a capacity of at least approximately 5 Ah and an impedance of less than or equal to approximately 50 mOhms.

Three prior art impact tools may include prior art product 1, $PA_1$, prior art product 2, $PA_2$, and prior art product 3, $PA_3$. The prior art product 1, $PA_1$ may be a DEWALT® DCF900 Impact Wrench sold by DeWalt Industrial Tool Co. The prior art product 2, $PA_2$ may be a Makita® XWT08 impact wrench sold by Makita Corp. The prior art product 3, $PA_3$ may be a Milwaukee® MK2863 impact wrench sold by Milwaukee Electric Tool Corp. The prior art product 3, $PA_3$ may be Milwaukee Tools® MK2767. Milwaukee® MK2767 and Milwaukee® MK2863 have very similar configuration, and very similar performance and structural characteristics.

The prior art product 1, $PA_1$, the prior art product 2, $PA_2$ (Makita® XWT08), and the prior art product 3, $PA_3$ (Milwaukee® MK2863) may use one of the following batteries, respectively: battery, $B_1$, battery, $B_3$, battery, $B_4$. The battery, $B_1$ may be a DEWALT® DCB205 20V MAX 5.0 Ah battery. The battery, $B_3$ may be a Makita® BL1850B 18V 5.0 Ah battery. The battery, $B_4$ may be Milwaukee® XC5.0 battery.

Figure 8:
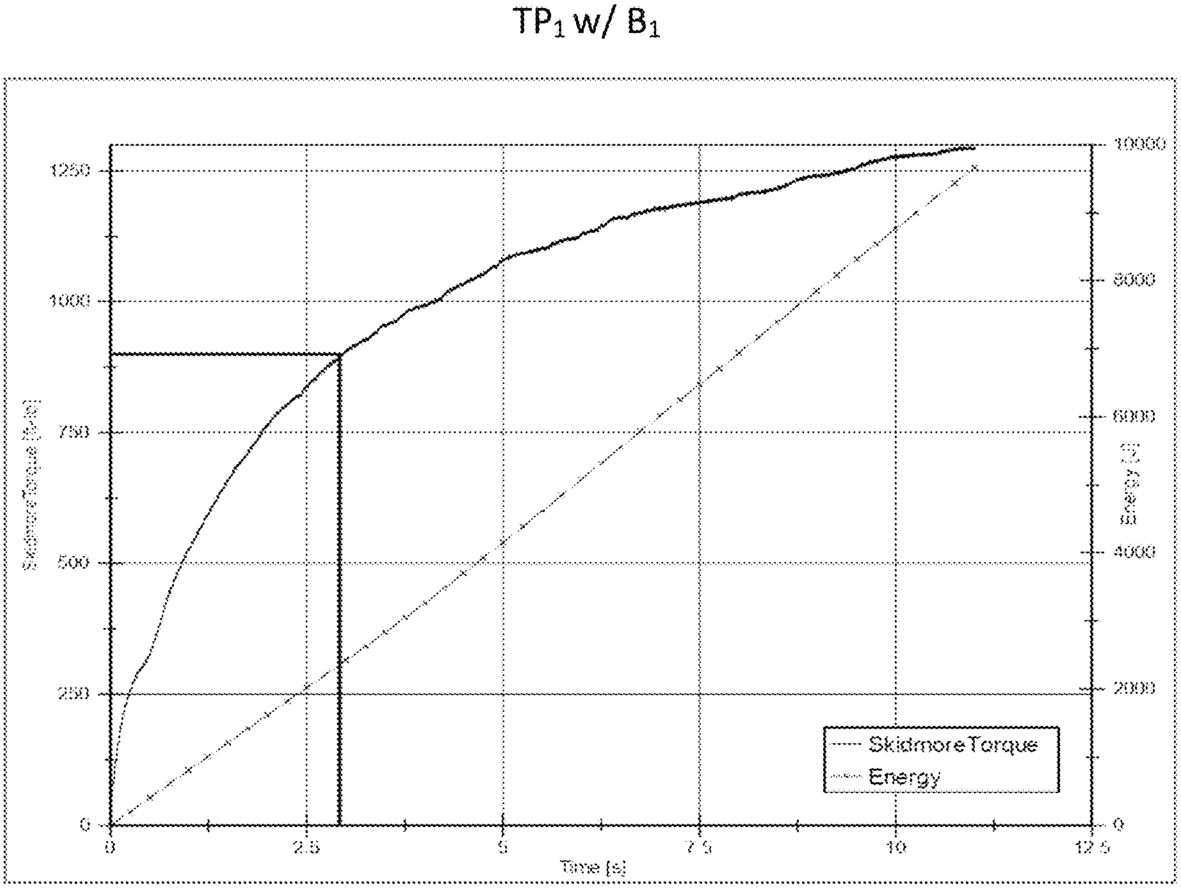
FIG. 8 is a graphical representation of a torque (vs time) curve and an energy (vs time) curve for a first impact tool using a first battery/power source according to embodiments of the present patent application.
Figure 9:
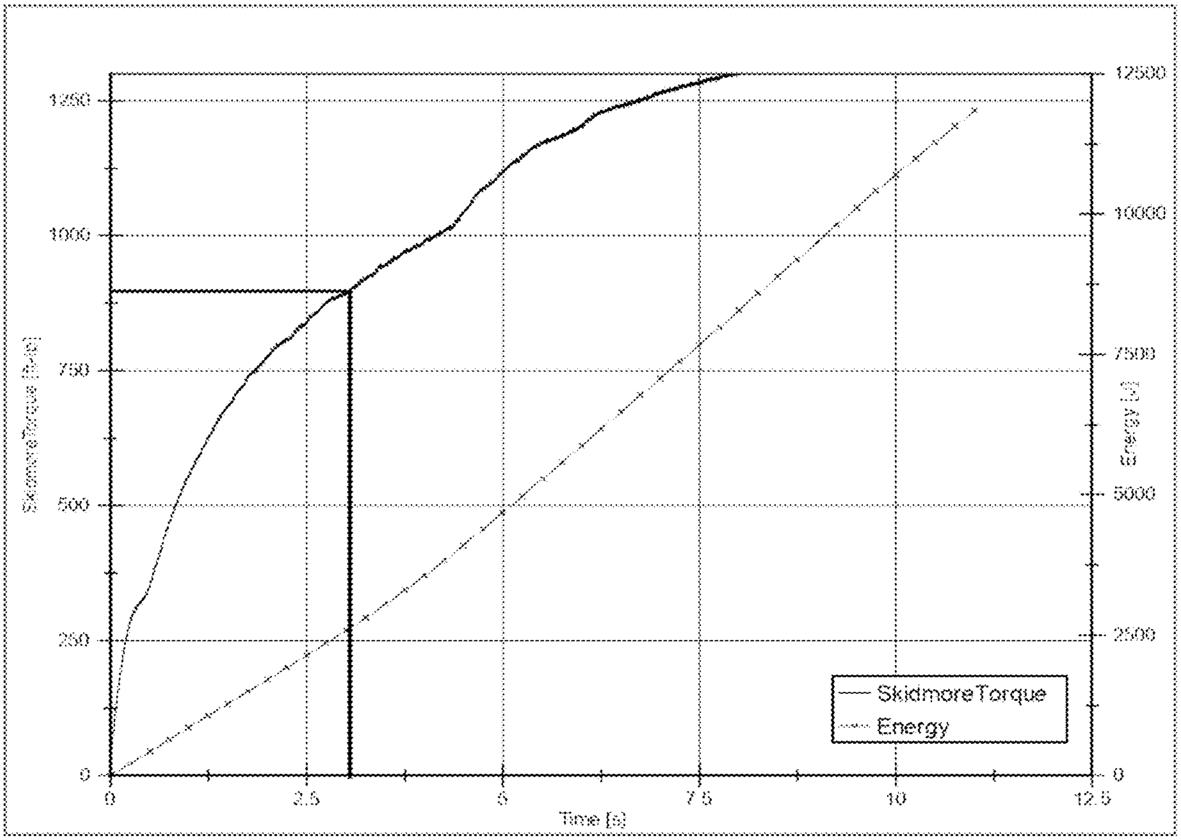
FIG. 9 is a graphical representation of a torque (vs time) curve and an energy (vs time) curve for a first impact tool using a second battery/power source according to embodiments of the present patent application, wherein the first battery is different from the second battery.
Figure 10:
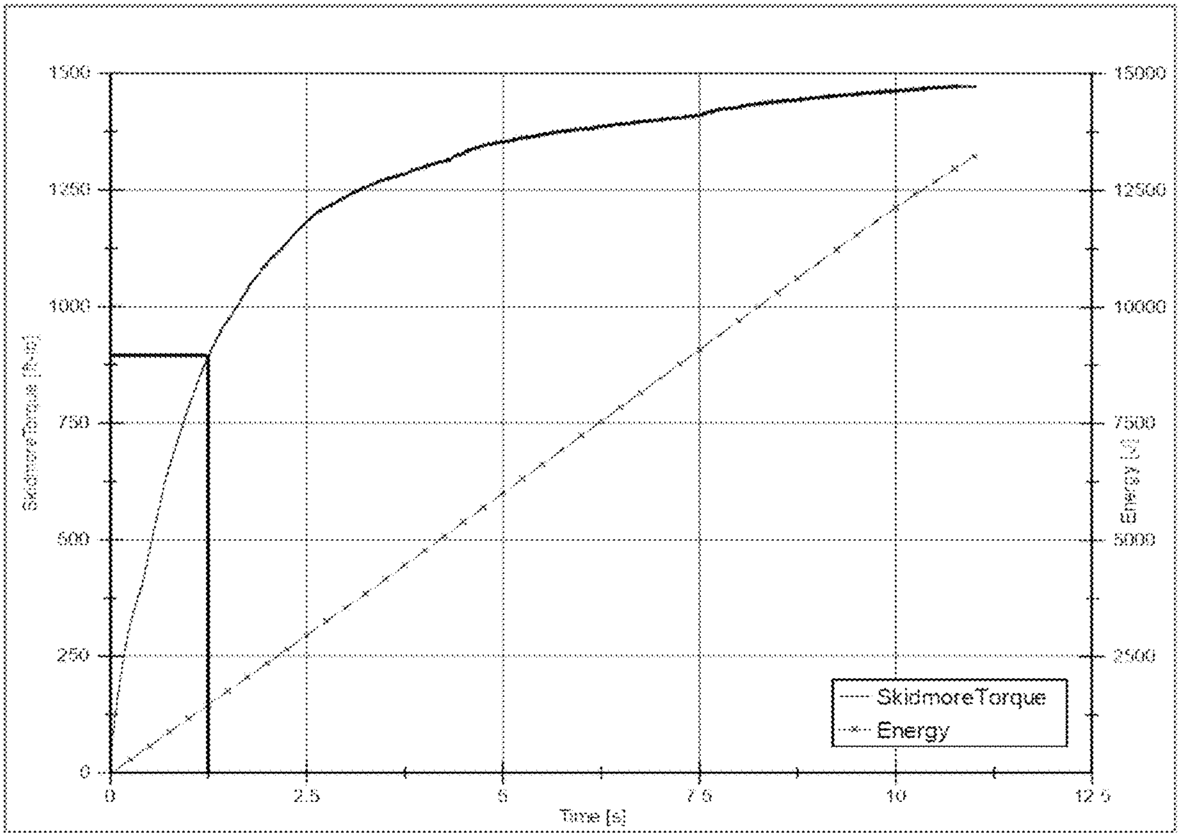
FIG. 10 is a graphical representation of a torque (vs time) curve and an energy (vs time) curve for a second impact tool using the second battery/power source according to embodiments of the present patent application.
Figure 11:
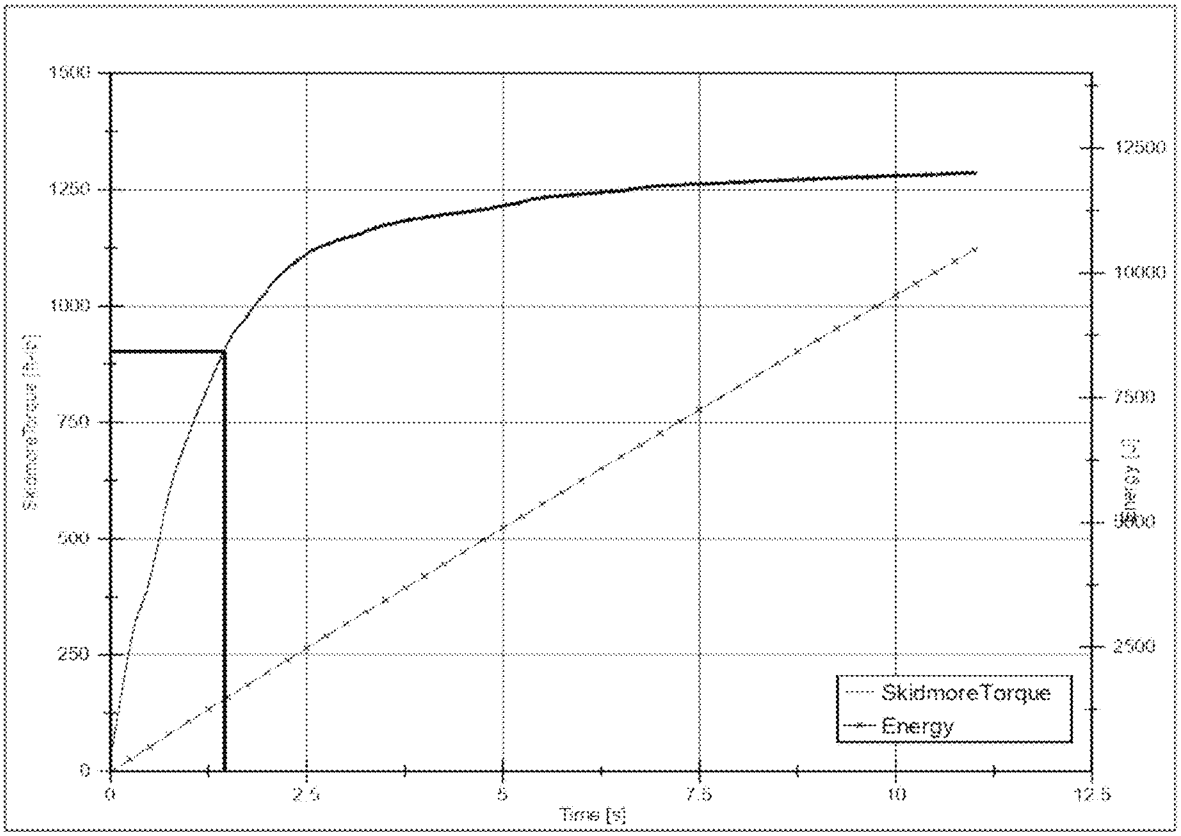
FIG. 11 is a graphical representation of a torque (vs time) curve and an energy (vs time) curve for a second impact tool using the first battery/power source according to embodiments of the present patent application.

FIG. 8 shows a torque-time profile and an energy-time profile for the tool product 1, $TP_1$ that uses the battery 1, $B_1$. FIG. 9 shows a torque-time profile and an energy-time profile for the tool product 1, $TP_1$ using a battery 2, $B_2$ (. FIG. 10 shows a torque-time profile and an energy-time profile for the tool product 2, $TP_2$ that uses the battery 2, $B_2$. FIG. 11 shows a torque-time profile and an energy-time profile for the tool product 2, $TP_2$ (that uses the battery 1, $B_1$.

Figure 12:
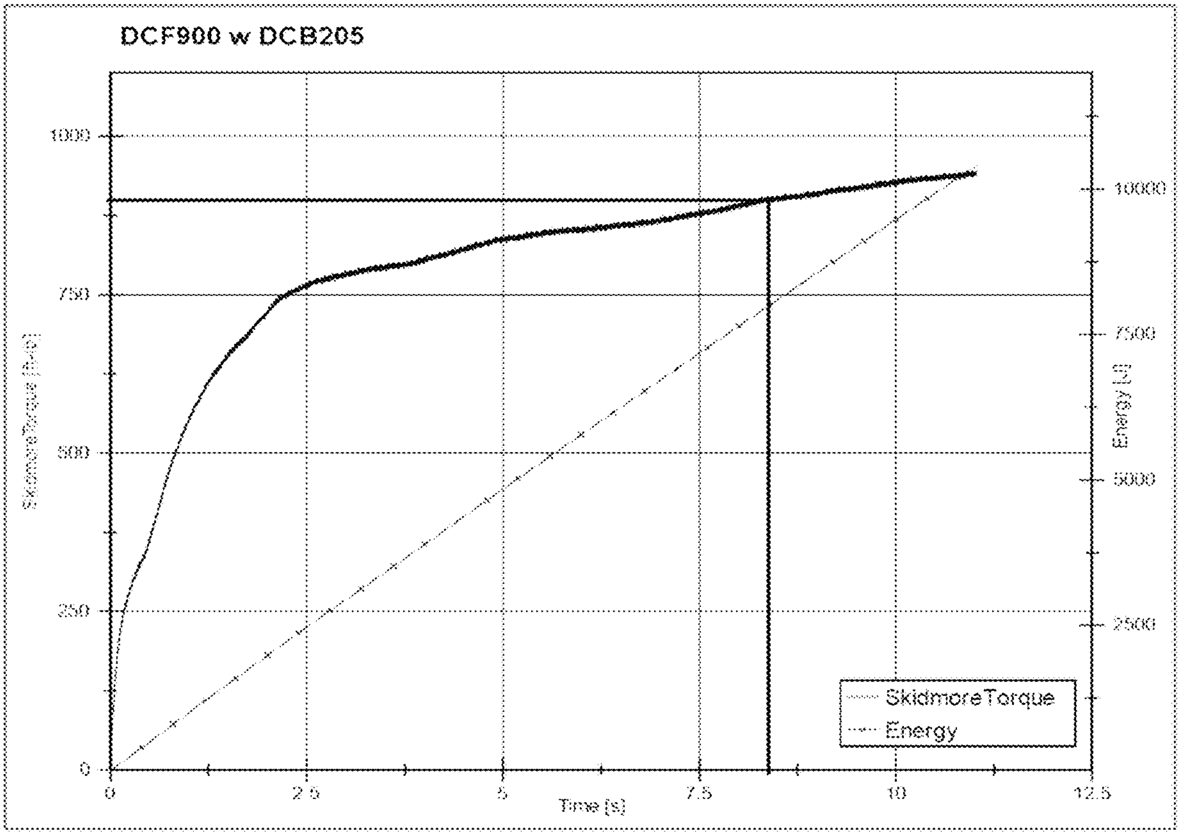
FIG. 12 is a graphical representation of a torque (vs time) curve and an energy (vs time) curve for a first prior art impact tool using the first battery/power source.
Figure 13:
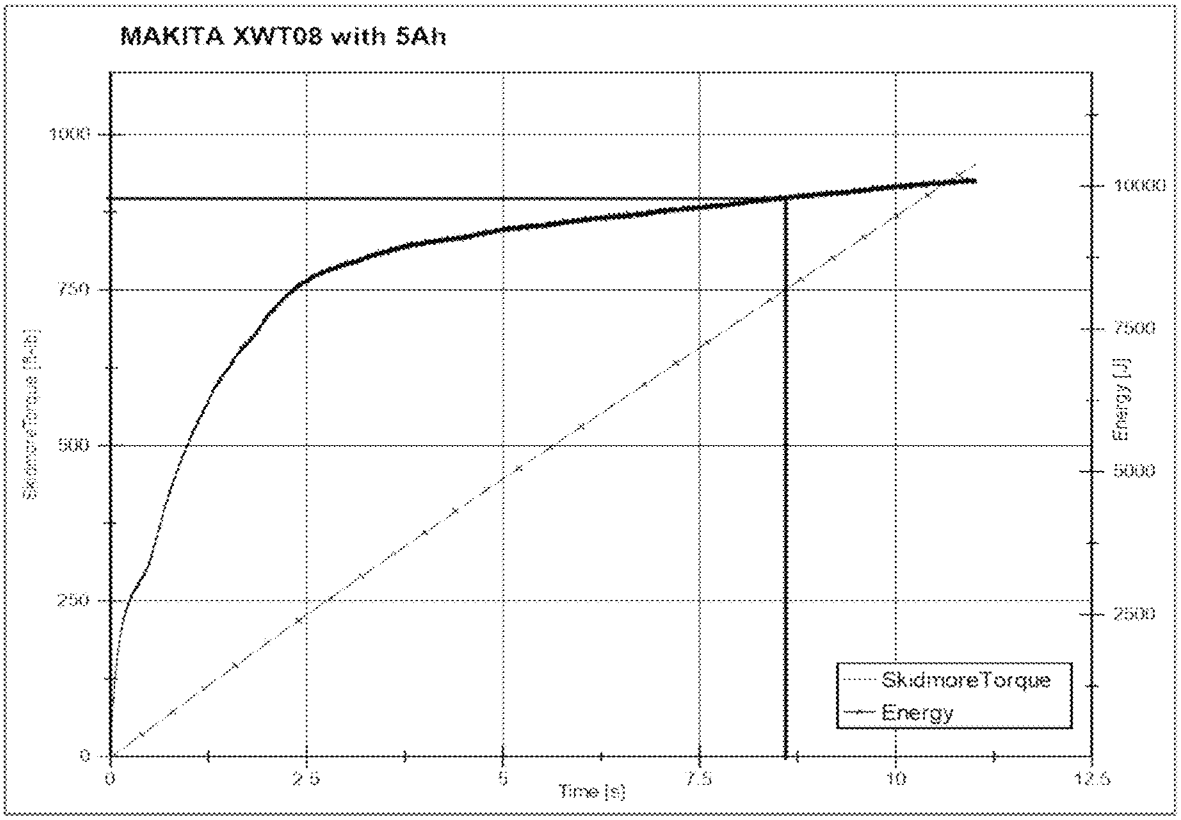
FIG. 13 is a graphical representation of a torque (vs time) curve and an energy (vs time) curve for a second prior art impact tool using a third battery/power source, the third battery/power source is different from the first, and the second battery.
Figure 14:
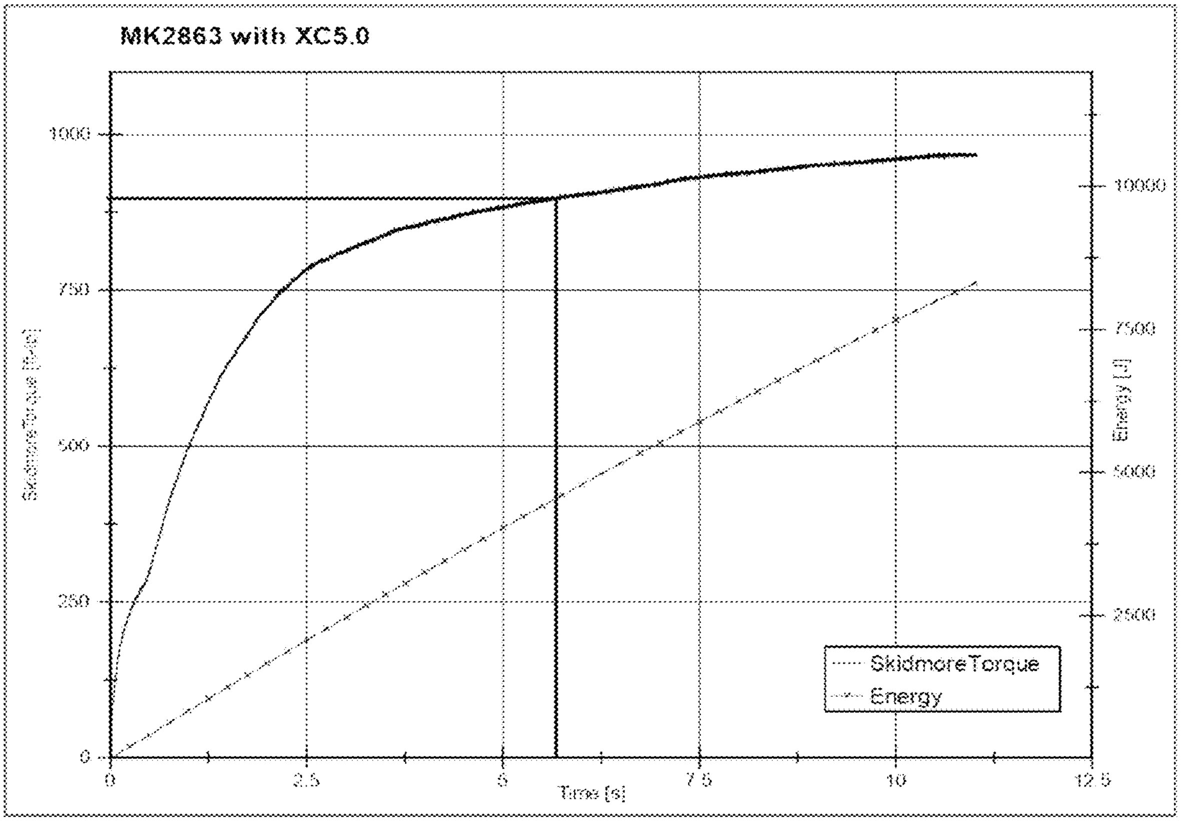
FIG. 14 is a graphical representation of a torque (vs time) curve and an energy (vs time) curve for a third prior art impact tool using a fourth battery/power source, wherein the fourth battery/power source is different from the first, the second and the third battery.

FIG. 12 shows a torque-time profile and an energy-time profile for the prior art product 1, $PA_1$ using the battery 1, $B_1$. FIG. 13 shows a torque-time profile and an energy-time profile for the prior art product 2, $PA_2$ (Makita® XWT08) using a battery having 18V and 5.0 Ah. FIG. 14 shows a torque-time profile and an energy-time profile for the prior art product 3, $PA_3$ (Milwaukee® MK2863) using Milwaukee® XC5.

Examples of time taken (in seconds) for a power tool to achieve a fastening torque of at least approximately 900 ft-lbs, and/or an input energy (in Joules) for the power tool to achieve the fastening torque of at least approximately 900 ft-lbs may be as shown in the TABLE 1 below. In other embodiments, these values (e.g., time taken to and input energy for approximately 900 ft-lbs, etc.) may vary within a range (e.g., plus or minus 5% to 20%, such as 10%) as will be understood by one of ordinary skill in the art).

TABLE 1

| Tool Product | Battery | Time taken (in seconds) to approximately 900ft-lbs | Input Energy (in Joules) to approximately 900ft-lbs |
|---|---|---|---|
| $TP_1$ | $B_1$ | 2.97 | 2401 |
| $TP_2$ | $B_1$ | 1.45 | 1449 |
| $TP_1$ | $B_2$ | 3.07 | 2650 |
| $TP_2$ | $B_2$ | 1.28 | 1505 |
| $PA_1$ | $B_1$ | 8.3 | 7938 |
| $PA_2$ | $B_3$ | 8.6 | 8200 |
| $PA_3$ | $B_4$ | 5.72 | 4575 |

Referring to TABLE 1 above and FIGS. 7-14, the power tool according to an embodiment of the present patent application is configured to achieve a fastening torque of at least approximately 900 ft-lbs in a time of less than approximately 3.5 s. The tool product 1, $TP_1$ may be configured to achieve the fastening torque of at least approximately 900 ft-lbs in a time of approximately 3.07 s. The power tool of the present patent application may be configured to achieve a fastening torque of at least approximately 900 ft-lbs in a time of less than approximately 3 s. The tool product 1, $TP_1$ may be configured to achieve the fastening torque of at least approximately 900 ft-lbs in a time of approximately 2.97 s. The power tool of the present patent application may be configured to achieve a fastening torque of at least approximately 900 ft-lbs in a time of less than approximately 2 s. The power tool of the present patent application may be configured to achieve a fastening torque of at least approximately 900 ft-lbs in a time of less than approximately 1.5 s. The tool product 2, $TP_2$ may be configured to achieve the fastening torque of at least approximately 900 ft-lbs in a time of approximately 1.45 s. The tool product 2, $TP_2$ may be configured to achieve the fastening torque of at least approximately 900 ft-lbs in a time of approximately 1.28 s.

In other embodiments, the power tool of the present patent application is configured to achieve the fastening torque of at least approximately 900 ft-lbs in a time of less than approximately 4 s. In other embodiment, the power tool of the present patent application is configured to achieve the fastening torque of at least approximately 900 ft-lbs in a time of less than approximately 4.5 s. In other embodiment, the power tool of the present patent application is configured to achieve the fastening torque of at least approximately 900 ft-lbs in a time of less than approximately 5 s. In other embodiment, the power tool of the present patent application is configured to achieve the fastening torque of at least approximately 900 ft-lbs in a time of less than approximately 5.5 s.

Referring to Table 1 above and FIGS. 7-14, the power tool of the present patent application is configured to achieve the fastening torque of at least approximately 900 ft-lbs with an input energy of less than approximately 2500 J (e.g., the tool product 1, $TP_1$ using the battery, $B_1$ achieves the fastening torque of at least approximately 900 ft-lbs with the input energy of approximately 2401 J). In one embodiment, the power tool of the present patent application is configured to achieve the fastening torque of at least approximately 900 ft-lbs with an input energy of less than approximately 2700 J (e.g., the tool product 1, $TP_1$ using the battery, $B_2$ achieves the fastening torque of at least approximately 900 ft-lbs with the input energy of approximately 2650 J). In one embodiment, the power tool of the present patent application is configured to achieve the fastening torque of at least approximately 900 ft-lbs with an input energy of less than approximately 1550 J (e.g., the tool product 2, $TP_2$ using the battery, $B_2$ achieves the fastening torque of at least 900 ft-lbs with the input energy of approximately 1505 J). In one embodiment, the power tool of the present patent application is configured to achieve the fastening torque of at least approximately 900 ft-lbs with an input energy of less than approximately 1500 J (e.g., the tool product 2, $TP_2$ using the battery, $B_1$ achieves the fastening torque of at least approximately 900 ft-lbs with the input energy of approximately 1449 J).

FIGS. 7-14 show how much faster the impact tools according to the embodiments of the present patent application can reach a torque of approximately 900 ft-lbs (shown by a 900 ft-lbs torque reference line in FIG. 7) compared to the prior art impact tools. The torque of 900 ft-lbs may be achieved by the impact tools of the present patent application and the prior art impact tools. The torque of 900 ft-lbs may be at a higher/upper end of the torque range of both the impact tools of the present patent application and the prior art impact tools. FIGS. 8-14 shows how much less energy the impact tools according to the embodiments of the present patent application take compared to the prior art impact tools to achieve a torque of 900 ft-lbs.

For example, in one embodiment, the impact power tool of the present patent application, which has a tool length of approximately 8.75 inches, an approximately ¾ inch anvil, a tool weight of approximately 8.0 pounds, a tool height of approximately 9.68 inches, and a tool nosecone width of approximately 3.72 inches, may be configured to reach a torque of approximately 900 ft-lbs in approximately 1.45 s and with an input energy of approximately 1449 J. In another embodiment, the impact power tool of the present patent application, which has a tool length of approximately 8.75 inches, an approximately ¾ inch anvil, a tool weight of approximately 8.0 pounds, a tool height of approximately 9.68 inches, and a tool nosecone width of approximately 3.72 inches, may be configured to reach a torque of 900 ft-lbs in approximately 1.28 s and with an input energy of approximately 1505 J.

That is, the tool product 2, $TP_2$ may be configured to achieve the fastening torque of at least approximately 900 ft-lbs in a time of approximately 1.45 s and with the input energy of approximately 1449 J when the tool uses the battery, $B_1$. The tool product 2, $TP_2$ may be configured to achieve the fastening torque of at least approximately 900 ft-lbs in a time of approximately 1.28 s and with the input energy of approximately 1505 J when the tool is using the battery, $B_2$.

For example, in one embodiment, the impact power tool of the present patent application, which has a tool length of approximately 8.43 inches, an approximately ½ inch anvil, a tool weight of approximately 7.65 pounds, a tool height of approximately 9.67 inches, and a tool nosecone width of approximately 3.72 inches, may be configured to reach a torque of approximately 900 ft-lbs in approximately 2.97 s and with an input energy of approximately 2401 J. In another embodiment, the impact power tool of the present patent application, which has a tool length of approximately 8.43 inches, an approximately ½ inch anvil, a tool weight of approximately 7.65 pounds, a tool height of approximately 9.67 inches, and a tool nosecone width of approximately 3.72 inches, may be configured to reach a torque of 900 ft-lbs in approximately 3.07 s and with an input energy of approximately 2650 J.

That is, the tool product 1, $TP_1$ may be configured to achieve the fastening torque of at least approximately 900 ft-lbs in a time of approximately 2.97 s and with the input energy of approximately 2401 J when the tool uses the battery, $B_1$. The tool product 1, $TP_1$ may be configured to achieve the fastening torque of at least approximately 900 ft-lbs in a time of approximately 3.07 s and with the input energy of approximately 2650 J when the tool uses the battery, $B_2$.

The tool product 1, $TP_1$ of the present patent application uses an approximately ½ inch anvil, while the tool product 2, $TP_2$ of the present patent application uses an approximately ¾ inch anvil. The above discussions and TABLE 1 also show that the two impact tools (e.g., one with an approximately ½ inch anvil and the other with an approximately ¾ inch anvil) of the present patent application may use different batteries to give a slightly different performance.

The prior art product 1, $PA_1$ (achieves the fastening torque of at least 900 ft-lbs in a time of 8.3 s and with the input energy of 7938 J when the prior art tool uses the battery, $B_1$.

The prior art product 2, $PA_2$ (Makita® XWT08) achieves the fastening torque of at least 900 ft-lbs in a time of 8.6 s and with the input energy of 8200 J when the prior art tool uses the battery, $B_3$ (a battery with 18V and 5.0 Ah).

The prior art product 3, $PA_3$ (Milwaukee® MK2863) achieves the fastening torque of at least 900 ft-lbs in a time of 5.72 s and with the input energy of 4575 J when the prior art tool uses the battery, $B_4$ (XC5.0).

In one embodiment, the power tool of the present patent application is configured to achieve the fastening torque of at least approximately 900 ft-lbs with an input energy of less than approximately 2700 J (e.g., the tool product 1, $TP_1$ using the battery, $B_2$ achieves the fastening torque of at least approximately 900 ft-lbs with the input energy of approximately 2650 J). In other embodiments, the power tool is configured to achieve the fastening torque of at least approximately 900 ft-lbs with an input energy of less than approximately 3000 J. In other embodiments, the power tool is configured to achieve the fastening torque of at least approximately 900 ft-lbs with an input energy of less than approximately 3500 J. In other embodiments, the power tool is configured to achieve the fastening torque of at least approximately 900 ft-lbs with an input energy of less than approximately 4000 J. In other embodiments, the power tool is configured to achieve the fastening torque of at least approximately 900 ft-lbs with an input energy of less than approximately 4500 J.

The total length of the power tool may be measured from a front end of the tool to a rear end of the tool. The total weight of the tool may be weight of the power tool (without the battery). The height of the power tool may be measured from a base of the power tool to a top end of the power tool. The width of the power tool may be at the nosecone (i.e., where the power tool is the widest). Examples of the approximate total length (in inches (in)) of, the anvil length, the total weight (in pounds (lbs)), the total height (in inches), and the width (in inches) of one embodiment of a power tool in accordance with the above description may be as shown in the TABLE 2 below. In other embodiments, these values (e.g., tool length, anvil, the tool weight, tool height, tool width, etc.) may vary within a range (e.g., plus or minus 5% to 20%, such as 10%) as will be understood by one of ordinary skill in the art):

TABLE 2

| Tool Product | Length (in inches) | Anvil (in inches) | Tool Weight (in pounds/lbs) | Tool Height (in inches) | Nosecone Width (in inches) |
|---|---|---|---|---|---|
| $TP_1$ | 8.43 | 1/2 | 7.65 | 9.67 | 3.72 |
| $TP_2$ | 8.75 | 3/4 | 8.0 | 9.68 | 3.72 |
| $PA_1$ | 8.8 | 1/2 | 6.4 | 9.1 | 3.4 |
| $PA_2$ | 9.1 | 1/2 | 6.5 | 9.56 | 3.55 |
| $PA_3$ | 8.39 | 1/2 | 7.5 | 10.75 | 3.15 |

The motor of the power tool of the present patent application is controlled to run at a speed between approximately 15000 rpm and approximately 32000 rpm. The motor of the power tool of the present patent application is controlled to run at a speed between approximately 13000 rpm and approximately 24000 rpm. The motor of the power tool of the present patent application is controlled to run at a speed between approximately 14000 rpm and approximately 27000 rpm. For example, in the embodiments of the present patent application as shown in TABLE 3, the motor is controlled to run at a speed of approximately 21262.5 rpm, approximately 22995 rpm or approximately 23073.75 rpm. By contrast, the motors of the prior art power tools operate at 12100 rpm or 12600 rpm as shown in TABLE 3

The hammer has an inertia that in the range between approximately 400 kg·mm$^2$ and approximately 3000 kg·mm$^2$. The hammer has an inertia that in the range between approximately 500 kg·mm$^2$ and approximately 2800 kg·mm$^2$. The hammer has an inertia that in the range between approximately 600 kg·mm$^2$ and approximately 1200 kg·mm$^2$. For example, hammer has an inertia is approximately 640 kg·mm$^2$, in one embodiment of the present patent application as shown in TABLE 3. By contrast, the hammers of the prior art power tools have inertia of 300 kg·mm$^2$ or 313 kg·mm$^2$ as shown in TABLE 3.

The compound planetary transmission achieves a gear reduction ratio between approximately 14:1 and approximately 30:1 (e.g., between approximately 15:1 and approximately 23:1). For example, the compound planetary transmission may achieve a gear reduction ratio of approximately 22.5, in one embodiment of the present patent application as shown in TABLE 3. By contrast, the prior art power tools achieve a maximum gear reduction ratio of 11:1 or 12:1 as shown in TABLE 3.

The beat rate of the hammer may be calculated using the formula shown below:

$$\text{Beat Rate} = 2 * \left(\frac{\text{Motor Speed}}{\text{Gear Ratio}}\right) \quad \text{Equation (1)}$$

The beat rate of the hammer is represented by beats/impacts per minute or in beats/impacts per second. The motor speed is represented in the units of rotations per minute. The gear ratios and the motor speeds are shown in TABLE 3. For example, the beat rate of the hammer may be 1890, 2044, or 2051 beats (or impacts) per minute, in the embodiment of the present patent application as shown in TABLE 3. By contrast, the prior art power tools have a beat rate of 2100 or 2200 beats (or impacts) per minute as shown in TABLE 3.

The camshaft speed is a ratio of the motor speed to the gear ratio. The camshaft speed is represented by rotations per minute or in rotations per second. The motor speed is represented in the units of rotations per minute. The gear ratios and the motor speeds are shown in TABLE 3.

The rotational kinetic energy of the impactor is shown in the Equation (2) below. In the Equation (2) below, the $KE_{rotational}$ is the rotational kinetic energy of the impactor, I is the moment of inertia of the impactor, and w is the rotational/angular velocity of the impactor. The rotational/angular velocity of the impactor is measured in the units of radians per second, and the kinetic energy of the impactor is measured in the units of Joules. The moment of inertia I, with units of kg·mm$^2$, of a single point particle about a fixed axis is simply m times r$^2$, with m being the mass of the point particle and r being the distance from the point particle to an axis of rotation. The Equation (2) shows that the kinetic energy of a rotating rigid body is directly proportional to the moment of inertia and the square of the angular velocity.

$$KE_{rotational} = \frac{1}{2}(I/1000000)\omega^2 \quad \text{Equation (2)}$$

The moment of inertia of the impactor may be interchangeably referred to as impact inertia (or simply inertia) of the impactor. For example, the impact inertia may be approximately 640 kg·mm$^2$ in the embodiments of the present patent application as shown in TABLE 3. By contrast, the prior art power tools have an impact inertia of 300 kg·mm$^2$ or 313 kg·mm$^2$ as shown in TABLE 3.

Examples of the type of transmission, the impact inertia (in kg·mm$^2$), the gear ratio, the motor speed (in rpm), and the beat rate (beats (or impacts) per minute) may be as shown in the TABLE 3 below. In other embodiments, these values may vary within a range (e.g., plus or minus 5% to 20%, such as 10%) as will be understood by one of ordinary skill in the art).

TABLE 3

| Tool Product | Battery | Transmission Type | Impact Inertia (in kg · mm$^2$) | Gear ratio | Motor speed (in rpm) | Beat Rate (in impacts per minute) |
|---|---|---|---|---|---|---|
| $TP_1$ | $B_1$ | Single stage compound planetary gear transmission | 640 | 22.5 | 21262.5 | 1890 |

TABLE 3-continued

| Tool Product | Battery | Transmission Type | Impact Inertia (in kg · mm$^2$) | Gear ratio | Motor speed (in rpm) | Beat Rate (in impacts per minute) |
|---|---|---|---|---|---|---|
| $TP_2$ | $B_1$ | Single stage compound planetary gear transmission | 640 | 22.5 | 21262.5 | 1890 |
| $TP_1$ | $B_2$ | Single stage compound planetary gear transmission | 640 | 22.5 | 22995 | 2044 |
| $TP_2$ | $B_2$ | Single stage compound planetary gear transmission | 640 | 22.5 | 23073.75 | 2051 |
| $PA_1$ | $B_1$ | Single stage planetary gear transmission | 300 | 11 | 12100 | 2200 |
| $PA_2$ | $B_3$ | Single stage planetary gear transmission | 354 | 10 | 11000 | 2200 |
| $PA_3$ | $B_4$ | Single stage planetary gear transmission | 313 | 12 | 12600 | 2100 |

Examples of the length of the power tool (in inches), the weight of the power tool (in pounds), the tightening performance (in ft-lbs), the breakaway performance (in ft-lbs), the ratio of the tightening performance to the length (in ft-lbs/inches), the ratio of the breakaway performance to the length (in ft-lbs/inches), the ratio of the tightening performance to the weight (in ft-lbs/lbs), and the ratio of the breakaway performance to the weight (in ft-lbs/lbs) may be as shown in the TABLE 4 below. In other embodiments, these values (e.g., tool length, the tool weight, tightening performance, breakaway performance, etc.) may vary within a range (e.g., plus or minus 5% to 20%, such as 10%) as will be understood by one of ordinary skill in the art).

TABLE 4

| Tool Product with Battery | Length (in inches) | Tool Weight (in lbs) | Tightening performance (in ft-lbs) | Breakaway performance (in ft-lbs) | Tightening to length Ratio (in ft-lbs/ inches) | Breakaway to Length Ratio (in ft-lbs/ inches) | Tightening to Weight Ratio (in ft-lbs/ inches) | Breakaway to weight Ratio (in ft-lbs/ inches) |
|---|---|---|---|---|---|---|---|---|
| $TP_1$ with $B_1$ | 8.43 | 7.65 | 1200 | 1750 | 142.35 | 207.59 | 156.86 | 228.76 |
| $TP_2$ with $B_1$ | 8.75 | 8.0 | 1200 | 1750 | 137.14 | 200 | 150 | 218.75 |
| $TP_1$ with $B_2$ | 8.43 | 7.65 | 1400 | 1900 | 166.07 | 225.39 | 183.01 | 248.37 |
| $TP_2$ with $B_2$ | 8.75 | 8.0 | 1400 | 1900 | 160 | 217.14 | 175 | 237.5 |
| $PA_1$ with $B_1$ | 8.8 | 6.4 | 1030 | 1400 | 117.05 | 159.09 | 160.93 | 218.75 |
| $PA_2$ with $B_3$ | 9.1 | 6.5 | 740 | 1180 | 81.3 | 129.67 | 113.85 | 181.54 |
| $PA_3$ with $B_4$ | 8.39 | 7.5 | 1000 | 1400 | 119.19 | 166.87 | 133.33 | 186.67 |

The tightening performance may be interchangeably referred to as fastening performance. At least one of a ratio of maximum fastening torque to tool length may be at least 5.5 ft-lbs/mm, a ratio of maximum fastening torque to tool housing volume may be at least 0.06 ft-lbs/mm$^2$, or a ratio of maximum fastening torque to tool weight, without a battery, may be at least 160 ft-lbs/lb. At least one of a ratio of maximum tightening torque to transmission diameter may be at least 8.0 ft-lbs/mm, a ratio of maximum tightening torque to transmission length may be at least 30 ft-lbs/mm, and a ratio of maximum tightening torque to transmission volume may be at least 20 ft-lbs/cm$^2$.

Higher torque and power output is highly beneficial to drive in fasteners quickly into tough objects like concrete, bricks, stone, etc. Additionally, a higher overall tool efficiency can be achieved which enables the impact driver to use less power from the battery, which will increase the total runtime of the tool on a single battery charge.

Example embodiments have been provided so that this disclosure will be thorough, and to fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Terms of degree such as "generally," "substantially," "approximately," and "about" may be used herein when describing the relative positions, sizes, dimensions, or values of various elements, components, regions, layers and/or sections. These terms mean that such relative positions, sizes, dimensions, or values are within the defined range or comparison (e.g., equal or close to equal) with sufficient precision as would be understood by one of ordinary skill in the art in the context of the various elements, components, regions, layers and/or sections being described.

Numerous modifications may be made to the exemplary implementations described above. These and other implementations are within the scope of this application.

What is claimed is:

1. A power tool comprising:

a housing having a rearward portion and a forward portion;

a motor disposed in the rearward portion of the housing and having a motor output shaft;

the motor being controlled to run at a speed between 15000 rotations per minute (rpm) and 32000 rpm;

an output spindle disposed at least partially in the forward portion of the housing;

a rotary impact assembly disposed in the forward portion of the housing and including a cam shaft, a hammer received over the cam shaft and configured to move rotationally and axially relative to the cam shaft, an anvil coupled to the output spindle, and a spring biasing the hammer axially forward toward the anvil, the rotary impact assembly configured so that the hammer transmits rotational motion to the anvil without rotational impacts when a torque on the output spindle is less than a threshold torque and to apply intermittent rotational impacts to the anvil when the torque on the output spindle is at least the threshold torque, the hammer having an inertia between 400 kilogram millimeters squared ($kg \cdot mm^2$) and 3000 $kg \cdot mm^2$;

a single stage compound planetary transmission configured to transmit rotational motion from the motor output shaft to the cam shaft, the planetary transmission including a sun gear rotatably driven by the motor output shaft, a planet carrier rotatably driving the cam shaft, a ring gear rotationally fixed relative to the housing, and a compound planet gear, the compound planet gear including a first planet gear meshed with the sun gear but not the ring gear and a second planet gear meshed with the ring gear but not the sun gear, the compound planet gear being carried by the planet carrier, wherein the compound planetary transmission has a gear reduction ratio between 14:1 and 30:1;

wherein the power tool is configured to achieve a fastening torque of at least 900 foot-pounds (ft-lbs) in a time of less than 3.5 seconds.

2. The power tool of claim 1, wherein the power tool is configured to achieve the fastening torque of at least 900 ft-lbs with an input energy of less than 2500 Joules (J).

3. The power tool of claim 1, wherein the power tool is configured to achieve a maximum fastening torque that is at least 1200 ft-lbs and a maximum breakaway torque that is at least 1700 ft-lbs.

4. The power tool of claim 3, wherein at least one of a ratio of maximum fastening torque to tool length of at least 5.5 ft-lbs/mm, a ratio of maximum fastening torque to tool housing volume of at least 0.06 ft-lbs/$mm^2$, or a ratio of maximum fastening torque to tool weight, without a battery, of at least 160 ft-lbs/lb.

5. The power tool of claim 3, wherein at least one of a ratio of maximum tightening torque to transmission diameter of at least 8.0 ft-lbs/mm, a ratio of maximum tightening torque to transmission length of at least 30 ft-lbs/mm, and a ratio of maximum tightening torque to transmission volume of at least 20 ft-lbs/$cm^2$.

6. The power tool of claim 1, wherein the beat rate of the hammer is between 1500 and 2400 beats per minute.

7. The power tool of claim 1, further comprising a battery back configured to supply power to the motor, the battery pack having a nominal voltage of at least 18 Volts (V) a capacity of at least 5 amp hours (Ah), and an impedance of less than or equal to 50 milliOhms (mOhms).

8. The power tool of claim 1, wherein a diameter of the transmission is between 40 millimeters (mm) and 200 mm.

9. The power tool of claim 1, wherein a length of the transmission is between 15 millimeters (mm) and 60 mm.

10. The power tool of claim 1, wherein the first planet gear has a first pitch diameter and the second planet gear has a second pitch diameter that is less than the first pitch diameter.

11. A power tool comprising:

a housing having a rearward portion and a forward portion;

a motor disposed in the rearward portion of the housing and having a motor output shaft;

the motor being controlled to run at a speed between 15000 rotations per minute (rpm) and 32000 rpm;

an output spindle disposed at least partially in the forward portion of the housing;

a rotary impact assembly disposed in the forward portion of the housing and including a cam shaft, a hammer received over the cam shaft and configured to move rotationally and axially relative to the cam shaft, an anvil coupled to the output spindle, and a spring biasing the hammer axially forward toward the anvil, the rotary impact assembly configured so that the hammer transmits rotational motion to the anvil without rotational impacts when a torque on the output spindle is less than a threshold torque and to apply intermittent rotational impacts to the anvil when the torque on the output spindle is at least the threshold torque, the hammer having an inertia between 400 kilogram millimeters squared ($kg \cdot mm^2$) and 3000 $kg \cdot mm^2$;

a single stage compound planetary transmission configured to transmit rotational motion from the motor output shaft to the cam shaft, the planetary transmission including a sun gear rotatably driven by the motor output shaft, a planet carrier rotatably driving the cam shaft, a ring gear rotationally fixed relative to the housing, and a compound planet gear, the compound planet gear including a first planet gear meshed with the sun gear but not the ring gear and a second planet gear meshed with the ring gear but not the sun gear, the compound planet gear being carried by the planet carrier, wherein the compound planetary transmission has a gear reduction ratio between 14:1 and 30:1;

wherein the power tool is configured to achieve a fastening torque of at least 900 foot-pounds (ft-lbs) with an input energy of less than 2500 Joules (J).

12. The power tool of claim 11, wherein the power tool is configured to achieve a maximum fastening torque that is at least 1200 ft-lbs and a maximum breakaway torque that is at least 1700 ft-lbs.

13. The power tool of claim 12, wherein at least one of a ratio of maximum fastening torque to tool length of at least 5.5 ft-lbs/mm, a ratio of maximum fastening torque to tool housing volume of at least 0.06 ft-lbs/mm2, or a ratio of maximum fastening torque to tool weight, without a battery, of at least 160 ft-lbs/lb.

14. The power tool of claim 12, wherein at least one of a ratio of maximum tightening torque to transmission diameter of at least 8.0 ft-lbs/mm, a ratio of maximum tightening torque to transmission length of at least 30 ft-lbs/mm, and a ratio of maximum tightening torque to transmission volume of at least 20 ft-lbs/cm2.

15. The power tool of claim 11, wherein the beat rate of the hammer is between 1500 and 2400 impacts per minute.

16. The power tool of claim 11, further comprises a battery having a nominal voltage of at least 18 Volts (V), a capacity of at least 5 amp hours (Ah), and an impedance of less than or equal to 50 milliOhms (mOhms).

17. The power tool of claim 11, wherein a diameter of the transmission is between 40 mm and 200 mm.

18. The power tool of claim 11, wherein a length of the transmission is between 15 mm and 60 mm.

19. The power tool of claim 1, wherein the first planet gear has a first pitch diameter and the second planet gear has a second pitch diameter that is less than the first pitch diameter.

20. A power tool comprising:

a housing having a rearward portion and a forward portion;

a motor disposed in the rearward portion of the housing and having a motor output shaft, the motor being controlled to run at a speed between 15000 rotations per minute (rpm) and 32000 rpm;

an output spindle disposed at least partially in the forward portion of the housing;

a rotary impact assembly disposed in the forward portion of the housing and including a cam shaft, a hammer received over the cam shaft and configured to move rotationally and axially relative to the cam shaft, an anvil coupled to the output spindle, and a spring biasing the hammer axially forward toward the anvil, the rotary impact assembly configured so that the hammer transmits rotational motion to the anvil without rotational impacts when a torque on the output spindle is less than a threshold torque and to apply intermittent rotational impacts to the anvil when the torque on the output spindle is at least the threshold torque, the hammer having an inertia between 400 kilogram millimeters squared ($kg \cdot mm^2$) and 3000 $kg \cdot mm^2$;

a single stage compound planetary transmission configured to transmit rotational motion from the motor output shaft to the cam shaft, the planetary transmission including a sun gear rotatably driven by the motor output shaft, a planet carrier rotatably driving the cam shaft, a ring gear rotationally fixed relative to the housing, and a compound planet gear, the compound planet gear including a first planet gear meshed with the sun gear but not the ring gear and a second planet gear meshed with the ring gear but not the sun gear, the compound planet gear being carried by the planet carrier, wherein the compound planetary transmission has a gear reduction ratio between 14:1 and 30:1, such that the beat rate of the hammer is between 1500 and 2400 beats per minute;

wherein the power tool is configured to achieve a fastening torque of at least 900 foot-pounds (ft-lbs) in a time of less than 3.5 seconds with an input energy of less than 2500 Joules (J).

* * * * *